United States Patent
Jang et al.

(10) Patent No.: US 12,294,123 B2
(45) Date of Patent: May 6, 2025

(54) FUEL CELL APPARATUS

(71) Applicant: LG ELECTRONICS INC., Seoul (KR)

(72) Inventors: Heejoong Jang, Seoul (KR); Dongkeun Yang, Seoul (KR); Hyoungsuk Woo, Seoul (KR); Hyeri Park, Seoul (KR)

(73) Assignee: LG ELECTRONICS INC, Seoul (KR)

( * ) Notice: Subject to any disclaimer, the term of this patent is extended or adjusted under 35 U.S.C. 154(b) by 309 days.

(21) Appl. No.: 18/070,805

(22) Filed: Nov. 29, 2022

(65) Prior Publication Data

US 2023/0170500 A1 Jun. 1, 2023

(30) Foreign Application Priority Data

Dec. 1, 2021 (KR) .................. 10-2021-0169947

(51) Int. Cl.
*H01M 8/04119* (2016.01)
*H01M 8/0438* (2016.01)
(Continued)

(52) U.S. Cl.
CPC ..... *H01M 8/04126* (2013.01); *H01M 8/0438* (2013.01); *H01M 8/04843* (2013.01); *H01M 8/04007* (2013.01); *H01M 8/04514* (2013.01)

(58) Field of Classification Search
CPC ........... H01M 8/04126; H01M 8/0438; H01M 8/04843; H01M 8/04395; H01M 8/04492;
(Continued)

(56) References Cited

U.S. PATENT DOCUMENTS

2004/0185315 A1 9/2004 Enjoji et al.
2020/0328445 A1* 10/2020 Weingaertner ...... H01M 8/0668

FOREIGN PATENT DOCUMENTS

CN 113067015 7/2021
JP 2001-216984 8/2001
(Continued)

OTHER PUBLICATIONS

Extended European Search Report dated Jun. 17, 2024 issued in Application No. 22210089.3.
(Continued)

*Primary Examiner* — Stewart A Fraser
(74) *Attorney, Agent, or Firm* — KED & ASSOCIATES, LLP

(57) ABSTRACT

A fuel cell apparatus may include a stack, a stack air blower configured to supply external air to the stack, a humidifier configured to extract moisture contained in exhaust air and to supply the extracted moisture to external air supplied to the stack, a first bypass channel configured to allow exhaust air to bypass the humidifier, a first three-way valve controlled to adjust the amount of exhaust air that bypasses the humidifier, and a humidity sensor configured to sense the humidity of external air. The fuel cell apparatus may also include a second bypass channel configured to allow external air to bypass the humidifier, a second three-way valve controlled to adjust the amount of external air that bypasses the humidifier, and a controller configured to control the first three-way valve and the second three-way valve depending on the sensed humidity value of the external air.

20 Claims, 17 Drawing Sheets

(51) Int. Cl.
*H01M 8/04828* (2016.01)
*H01M 8/04007* (2016.01)
*H01M 8/04492* (2016.01)

(58) Field of Classification Search
CPC ........... H01M 8/0618; H01M 8/04507; H01M 8/04835; H01M 8/04141; H01M 8/04119; H01M 8/04097; H01M 8/0432; H01M 8/04708; H01M 8/04753
See application file for complete search history.

(56) References Cited

FOREIGN PATENT DOCUMENTS

| JP | 2002-343398 | 11/2002 |
|---|---|---|
| JP | 2005-071748 | 3/2005 |
| JP | 2013-069485 | 4/2013 |
| JP | 2014-212124 | 11/2014 |
| JP | 2015-050024 | 3/2015 |
| JP | 2015-210871 | 11/2015 |
| JP | 2018-147841 | 9/2018 |
| JP | 2021-103670 | 7/2021 |
| KR | 10-2012-0071288 A | 7/2012 |
| KR | 10-2018-0068030 | 6/2018 |
| KR | 10-1951439 B1 | 5/2019 |
| KR | 10-2020-0055345 | 5/2020 |

OTHER PUBLICATIONS

Korean Office Action dated May 29, 2024 issued in Application No. 10-2021-0169947.
Japanese Office Action dated Oct. 17, 2023 issued in Japanese Patent appl. No. 2022-190888.
Japanese Office Action dated Mar. 26, 2024 issued in Application No. 2022-190888.
Korean Notice of Allowance dated Dec. 16, 2024, issued in Application No. 10-2021-0169947.

* cited by examiner

FUEL CELL APPARATUS

CROSS-REFERENCE TO RELATED APPLICATION

This application claims the benefit of Korean Patent Application No. 10-2021-0169947, filed on Dec. 1, 2021, with the Korean Intellectual Property Office, the subject matter of which is incorporated herein by reference in its entirety.

BACKGROUND

1. Field

The present disclosure relates to a fuel cell apparatus, and more particularly to a fuel cell apparatus capable of adjusting humidity of external air supplied to a stack.

2. Background

A fuel cell apparatus is an apparatus that reforms fuel gas in a reforming reactor so as to be converted into reformed gas including hydrogen, supplies the reformed gas to a stack, which is a power generator, and electrochemically reacts the hydrogen and oxygen in the stack with each other to generate electrical energy.

Similar to Document 1 (Korean Patent Application Publication No. 10-2012-0071288), the subject matter of which is incorporated herein by reference, a fuel cell apparatus may include a fuel processing device configured to reform fuel including hydrogen atoms into hydrogen gas and a stack configured to generate electrical energy using the hydrogen gas supplied from the fuel processing device. The fuel cell apparatus may further include a heat exchanger configured to cool the stack and to collect heat, a coolant pipe, and a power converter configured to convert produced DC power into AC power.

Since oxygen is essentially used in order to burn fuel gas in a burner (of the fuel processing device) or to generate electricity in the stack, the fuel cell apparatus may include a blower configured to blow external air to the fuel processing device or to the stack, similarly to Document 2 (Korean Registered Patent Publication No. 10-1951439), the subject matter of which is incorporated herein by reference.

The fuel cell apparatus may be operated in a preheating mode in which fuel gas is supplied and a reformer configured to generate reformed gas necessary for power generation by the stack is heated using the burner so as to be preheated to a temperature suitable for reforming.

Subsequently, when the temperature reaches the above temperature condition, the fuel cell apparatus may be operated in a reforming mode in which the reformed gas generated by the reformer is recirculated to the burner such that reforming is repeated until the concentration of hydrogen and carbon monoxide of the generated reformed gas reaches a concentration suitable for power generation by the stack.

Subsequently, when the concentration of the reformed gas reaches the above concentration condition, the fuel cell apparatus may be operated in a power generation mode in which the reformed gas and external air are supplied to the stack to produce electrical energy through electrochemical reaction.

During execution of the power generation mode, water may be generated in the stack as a byproduct of the electrochemical reaction. Moisture contained in the external air supplied to the stack may be condensed in the stack, whereby water may be generated.

The fuel cell apparatus may have a problem in which when the water in the stack is not smoothly drained and gathers in the stack, the area in which the electrochemical reaction occurs may be reduced, whereby a flooding phenomenon occurs in which efficiency of power generation by the stack is lowered.

Since it is necessary for the external air supplied to the stack to be supplied to the stack in a state of maintaining the humidity suitable for power generation by the stack, the fuel cell apparatus may include a humidifier configured to humidify the external air supplied to the stack, wherein moisture contained in exhaust air discharged from the stack is captured in the humidifier so as to be used for humidification of external air.

Since the exhaust air discharged from the stack contains moisture generated as the result of electrochemical reaction in the stack, the exhaust air is discharged in a high humidity state. However, the amount of moisture captured from the exhaust air in the humidifier may be excessively large. As a result, there is a problem in that excessive moisture is supplied to external air in the humidifier and over-humidified external air is supplied to the stack, whereby a flooding phenomenon may occur in the stack.

Additionally, the fuel cell apparatus may include no separate adjustment means configured to adjust the humidification amount of the humidifier in spite of the fact that the humidity of external air suctioned from the outside may be changed depending on various external environmental factors, such as weather or day and night, and the fact that the humidity of external air supplied to the stack may be changed depending on the operational state of the fuel cell apparatus. As a result, there may be a problem in that it is not possible to cope with a change in the humidity of external air suctioned from the outside, and low-humidity external air is supplied to the stack, whereby efficiency in power generation may be lowered, or over-humidified external air is supplied to the stack, whereby a flooding phenomenon may occur.

Additionally, the fuel cell apparatus may have a problem in which when the temperature of external air suctioned from the outside is low due to an external situation, such as winter or night, the saturated water vapor pressure of the external air supplied to the stack is lowered, whereby condensate may be easily generated in the stack, and therefore a flooding phenomenon may occur in the stack.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
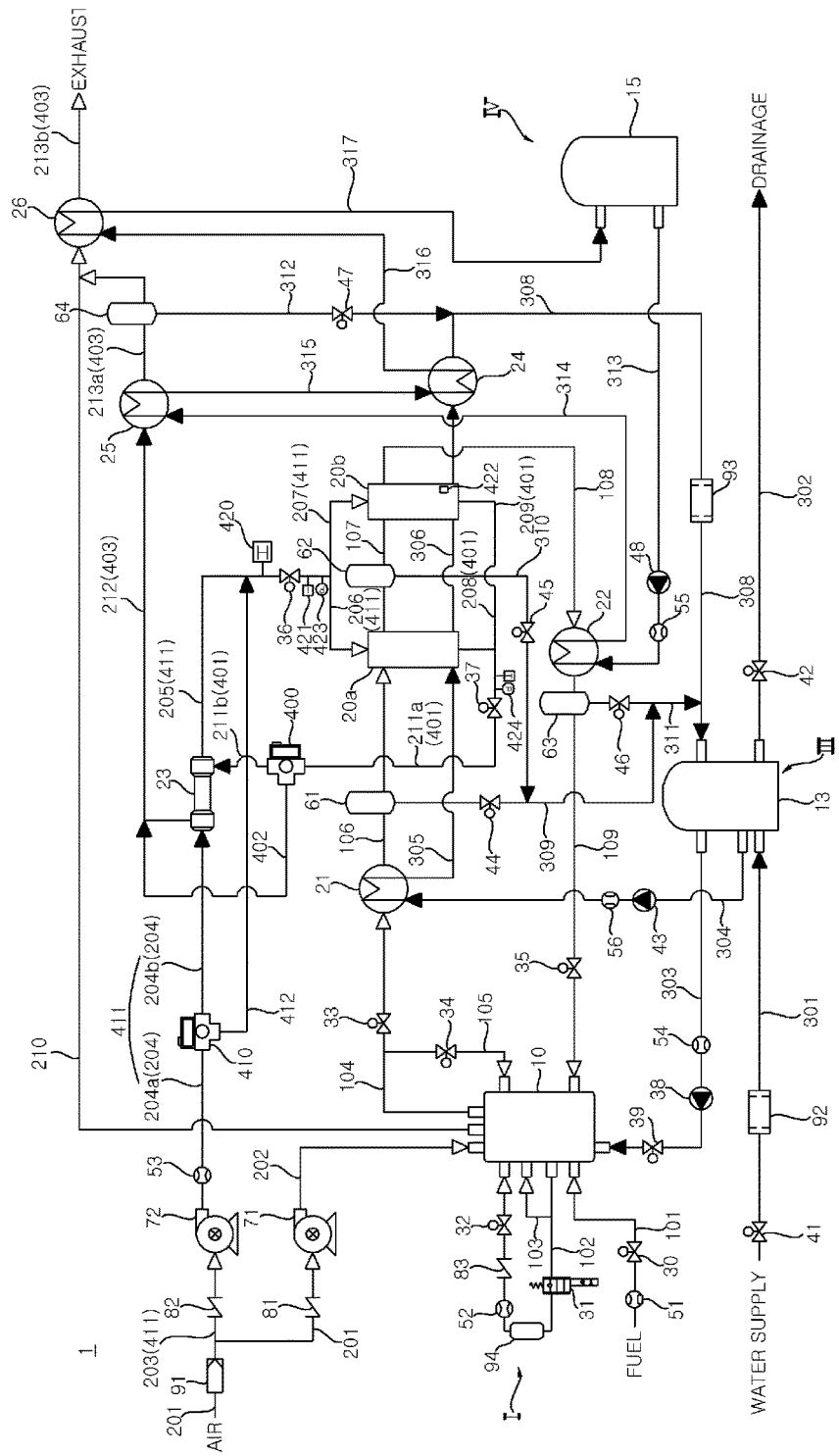
FIG. 1 is a view showing construction of a fuel cell apparatus according to a first embodiment of the present disclosure.

A fuel cell apparatus 1 according to an embodiment of the present disclosure may be described with reference to FIGS. 1 and 3. The fuel cell apparatus 1 may include stacks 20a and 20b, a reformer 140 configured to supply reformed gas to the stacks 20a and 20b, a stack air blower 72 configured to supply external air to the stacks 20a and 20b, a humidifier 23 configured to extract moisture contained in exhaust air discharged from the stacks 20a and 20b and to supply the extracted moisture to external air to be supplied to the stacks 20a and 20b, an exhaust channel 401 configured to connect the stacks 20a and 20b to the humidifier 23 such that exhaust air discharged from the stacks 20a and 20b is supplied to the humidifier 23, and a discharge channel 403 configured to discharge exhaust air that has passed through the humidifier 23 to the outside of the fuel cell apparatus.

Figure 17:
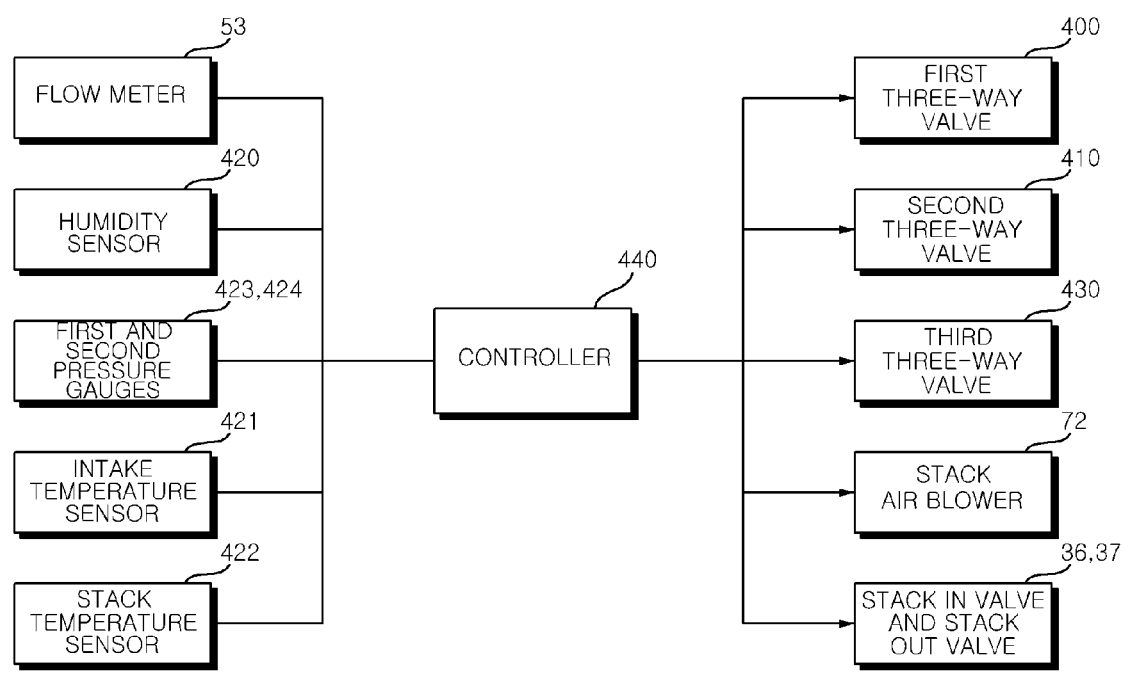
FIG. 17 is a control block diagram according to an embodiment of the present disclosure.

Additionally, the fuel cell apparatus 1 may include a first bypass channel 402 branched from the exhaust channel 401 and joined to the discharge channel 403, a first three-way valve 400 disposed at a portion of the exhaust channel 401 from which the first bypass channel 402 is branched, a humidity sensor 420 configured to sense humidity of external air supplied to the stacks 20a and 20b, and a controller 440 (FIG. 17) configured to control the first three-way valve 400 such that the amount of exhaust air supplied to the humidifier 23 is adjusted based on a value of the humidity of the external air sensed by the humidity sensor 420.

Additionally, the fuel cell apparatus 1 may include an external air introduction channel 203 configured to allow external air to pass therethrough so as to be suctioned to the stack air blower 72, a first intake channel 204 configured to connect the stack air blower 72 to the humidifier 23 and a second intake channel 205 configured to connect the humidifier 23 to the stacks 20a and 20b.

The stacks 20a and 20b may electrochemically react hydrogen contained in reformed gas supplied from a fuel processing device 10 with oxygen contained in external air supplied from the stack air blower 72 so as to generate electrical energy.

Each of the stacks 20a and 20b may be constituted by stacking unit cells, in each of which electrochemical reaction may occur. A unit cell may be constituted by a membrane-electrode assembly (MEA) including a fuel electrode and an air electrode disposed in the state in which an electrolyte member is interposed therebetween and a separator. At the fuel electrode of the membrane-electrode assembly, hydrogen may be divided into hydrogen ions and electrons by a catalyst, whereby electricity may be generated. At the air electrode of the membrane-electrode assembly, the hydrogen ions and the electrons may be combined with oxygen, whereby water may be generated.

Gas discharged from the stacks 20a and 20b without reaction may be called anode off gas (AOG).

Air supplied to the stacks 20a and 20b may be called external air. Air discharged from the stacks 20a and 20b, after being used for electrochemical reaction in the stacks 20a and 20b, may be called exhaust air.

In an embodiment of the present disclosure, the fuel cell apparatus 1 is described as including two stacks 20a and 20b. However, the present disclosure is not limited thereto. When the fuel cell apparatus 1 includes a plurality of two stacks 20a and 20b, reformed gas discharged from the first stack 20a without reaction may be additionally electrochemically reacted at the second stack 20b.

The reformer 140 may perform, using a catalyst, a reforming process of generating hydrogen gas from fuel gas from which a sulfur compound has been removed. For example, fuel gas discharged from a desulfurizer 110 may be mixed with steam discharged from a steam generator 130 at a second mixer 112, and may be supplied to the reformer 140. When the fuel gas and the steam supplied to the reformer 140 are reformed in the reformer 140, hydrogen gas may be generated. Gas discharged from the reformer 140 or gas discharged from the fuel processing device 10 via the reformer 140, a first reactor 150, and a second reactor 160 may be called reformed gas.

The reformer 140 may supply reformed gas to the stacks 20a and 20b.

The desulfurizer 110, the steam generator 130, the second mixer 112, and the first and second reactors 150, 160 may be described below.

The stack air blower 72 may suction and discharge external air. The stack air blower 72 may be connected to the external air introduction channel 203, which communicates with a main external air introduction channel 201, and an intake channel 411. The stack air blower 72 may suction external air introduced through the external air introduction channel 203, and may supply the suctioned external air to the stacks 20a and 20b through the intake channel 411.

The humidifier 23 may extract moisture contained in exhaust air discharged from the stacks 20a and 20b, and may supply the extracted moisture to external air passing through the intake channel 411. The humidifier 23 may supply moisture to external air to be supplied to the stacks 20a and 20b in order to form humidity conditions in which electrochemical reaction actively occurs in the stacks 20a and 20b.

As one example, the humidifier 23 may supply moisture to external air introduced through the first intake channel 204, and may discharge humidified external air through the second intake channel 205.

As one example, the humidifier 23 may extract moisture from exhaust air introduced through a second exhaust channel 211b, and may discharge dehumidified exhaust air through a humidifier discharge channel 212.

As one example, the humidifier 23 may be a fuel cell membrane humidifier including a membrane filter configured to selectively allow moisture to pass therethrough. An inner space of the humidifier 23 may be divided into a first space, in which external air flows, and a second space, in which exhaust air flows, by the membrane filter. Moisture in exhaust air supplied to the humidifier 23 may be transferred to the first space through the membrane filter. The other ingredients of the exhaust air supplied to the humidifier 23, excluding the moisture, may be discharged from the humidifier 23 through the second space without passing through the membrane filter. External air supplied to the humidifier 23 may be humidified while flowing in the first space, and may be discharged from the humidifier 23.

The external air introduction channel 203 may allow external air to pass therethrough so as to be suctioned to the stack air blower 72. The external air introduction channel 203 may communicate with the main external air introduction channel 201, through which external air is introduced, such that external air is introduced through the main external air introduction channel 201. The external air introduction channel 203 may be connected to the stack air blower 72 such that external air introduced through the main external air introduction channel 201 is suctioned to the stack air blower 72.

The external air introduction channel 203 may be connected to the rear end of an air filter 91. A second air check valve 82 configured to control an air flowing direction may be disposed in the external air introduction channel 203.

The intake channel 411 may supply external air discharged from the stack air blower 72 to the stacks 20a and 20b. The intake channel 411 may connect the stack air blower 72 to the stacks 20a and 20b. The intake channel 411 may include the first intake channel 204, the second intake channel 205, and individual supply channels 206 and 207.

The first intake channel 204 may connect the stack air blower 72 to the humidifier 23. The first intake channel 204 may supply external air discharged from the stack air blower 72 to the humidifier 23. A flow meter 53 configured to sense the flow rate of external air discharged from the stack air blower 72 may be disposed in (or at) the first intake channel 204.

The second intake channel 205 may connect the humidifier 23 and the stacks 20a and 20b to each other. External air discharged from the humidifier 23 may be supplied to the stacks 20a and 20b through the second intake channel 205.

The second intake channel 205 may be connected to the individual supply channels 206 and 207, which correspond to the stacks 20a and 20b, respectively. External air discharged from the humidifier 23 and flowing through the second intake channel 205 may be supplied to the stacks 20a and 20b through the individual supply channels 206 and 207.

The exhaust channel 401 may connect the stacks 20a and 20b to the humidifier 23 such that exhaust air is discharged from the stacks 20a and 20b and is supplied to the humidifier 23. The exhaust channel 401 may include individual discharge channels 208 and 209 and first and second exhaust channels 211a and 211b.

The exhaust channel 401 may be divided into the first exhaust channel 211a and the second exhaust channel 211b by the first three-way valve 400 disposed at the portion of the exhaust channel 401 from which the first bypass channel 402 is branched. The first exhaust channel 211a may connect the stacks 20a and 20b to the first three-way valve 400. Exhaust air discharged from the stacks 20a and 20b may be supplied to the first three-way valve 400 through the first exhaust channel 211a. Exhaust air flowing through the first exhaust channel 211a may include moisture generated by electrochemical reaction occurring in the stacks 20a and 20b.

The first exhaust channel 211a may be connected to the individual discharge channels 208 and 209, which correspond to the stacks 20a and 20b, respectively. Exhaust air discharged from the stacks 20a and 20b may flow to the first exhaust channel 211a through the individual discharge channels 208 and 209.

The second exhaust channel 211b may connect the first three-way valve 400 to the humidifier 23. Exhaust air supplied to the first three-way valve 400 may be supplied to the humidifier 23 through the second exhaust channel 211b.

The discharge channel 403 may discharge exhaust air that has passed through the humidifier 23 to the outside (of the fuel cell apparatus). The discharge channel 403 may include a humidifier discharge channel 212, a first air discharge channel 213a, a portion of an exhaust gas discharge channel 210, and a second air discharge channel 213b.

The humidifier discharge channel 212 may connect the humidifier 23 to an air heat exchanger 25. Exhaust air that has passed through the humidifier 23 may be supplied to the air heat exchanger 25 through the humidifier discharge channel 212. The exhaust air supplied to the air heat exchanger 25 may exchange heat with water discharged from an AOG heat exchanger 22, and may be discharged from the air heat exchanger 25.

The first air discharge channel 213a may be joined (or connected) to the exhaust gas discharge channel 210 by the air heat exchanger 25. An air moisture remover 64 may be disposed in (or at) the first air discharge channel 213a. Exhaust air discharged from the air heat exchanger 25 may be introduced into the air moisture remover 64, moisture may be removed from the exhaust air, and the exhaust air may be introduced into the exhaust gas discharge channel 210.

The exhaust gas discharge channel 210 may be connected to an exhaust heat exchanger 26 from the fuel processing device 10. Exhaust air introduced into the exhaust gas discharge channel 210 may be mixed with exhaust gas flowing in the exhaust gas discharge channel 210, and may be supplied to the exhaust heat exchanger 26.

The second air discharge channel 213b may communicate with the outside from the exhaust heat exchanger 26. Exhaust air and exhaust gas supplied to the exhaust heat exchanger 26 may exchange heat with water, and may be discharged to the outside through the second air discharge channel 213b.

The air heat exchanger 25, the air moisture remover 64, the exhaust heat exchanger 26, and the AOG heat exchanger 22 may be described below in detail.

The first bypass channel 402 may be branched from the exhaust channel 401, and may be joined to the discharge channel 403.

The first bypass channel 402 may allow exhaust air flowing in the first exhaust channel 211a to bypass the humidifier 23 so as to be directly supplied to the discharge channel 403.

The first three-way valve 400 may be disposed at the portion of the exhaust channel 401 from which the first bypass channel 402 is branched.

The first three-way valve 400 may be disposed in the exhaust channel 401 so as to separate (or divide) the exhaust channel 401 into the first exhaust channel 211a and the second exhaust channel 211b.

The first three-way valve 400 may receive exhaust air from the first exhaust channel 211a, and may supply the exhaust air to the first bypass channel 402 and/or the second exhaust channel 211b. The first three-way valve 400 may close the second exhaust channel 211b in proportion to the degree of opening of the first bypass channel 402. That is, the first three-way valve 400 may allow the opening amount of the first bypass channel 402 and the opening amount of the second exhaust channel 211b to be inversely proportional to each other.

As one example, when the first bypass channel 402 is open 30%, the second exhaust channel 211b may be open 70%. At this time, about 30% of exhaust air supplied to the first three-way valve 400 may be supplied to the first bypass channel 402, and the remainder of the exhaust air (i.e. about 70% of the exhaust air) may be supplied to the second exhaust channel 211b.

As one example, when the second exhaust channel 211b is open 100%, the first bypass channel 402 may be closed. At this time, all exhaust air supplied to the first three-way valve 400 may be supplied to the second exhaust channel 211b.

A stack in valve 36 may be disposed at the portion of the second intake channel 205 adjacent to the stacks 20a and 20b to block external air to be supplied to the stacks 20a and 20b. A stack out valve 37 may be disposed at the portion of the exhaust channel 401 adjacent to the stacks 20a and 20b to block exhaust air discharged from the stacks 20a and 20b.

The stack in valve 36 and the stack out valve 37 may be closed such that no foreign matter is introduced into the stacks 20a and 20b in an operational mode in which no external air is supplied to the stacks 20a and 20b, among operational modes of the fuel cell apparatus 1. Alternatively, the opening amount of each of the stack in valve 36 and the stack out valve 37 may be adjusted to adjust the flow rate of external air supplied to the stacks 20a and 20b and/or the flow rate of exhaust air discharged from the stacks 20a and 20b.

A first pressure gauge 423 may be disposed in (or at) the second intake channel 205 so as to be adjacent to the stacks 20a and 20b in order to sense the pressure of external air to be supplied to the stacks 20a and 20b. A second pressure gauge 424 may be disposed in (or at) the exhaust channel 401 so as to be adjacent to the stacks 20a and 20b in order to sense the pressure of exhaust air discharged from the stacks 20a and 20b.

An intake temperature sensor 421 may be disposed in (or at) the second intake channel 205 to sense the temperature of external air to be supplied to the stacks 20a and 20b. A stack temperature sensor 422 may sense the internal temperature of the stacks 20a and 20b.

A first temperature sensor 422a (FIGS. 10-13) may be disposed in a stack water supply channel 305 to sense the temperature of coolant supplied to the stacks 20a and 20b. A second temperature sensor 422b (FIGS. 10-13) may be disposed in a stack water discharge channel 307 to sense the temperature of coolant discharged from the stacks 20a and 20b.

The humidity sensor 420 may sense the humidity of external air supplied to the stacks 20a and 20b. The humidity sensor 420 may be disposed in (or at) the second intake channel 205 to sense the humidity of external air discharged from the humidifier 23. The sensed humidity may also be referred to as humidity value. The controller 440 may include at least one processor. The processor may be a general processor, such as a central processing unit (CPU). The processor may be a dedicated device, such as an ASIC, or another hardware-based processor. The controller 440 is a structure to control the overall operation of the fuel cell apparatus 1. The controller 440 may be connected to each component provided in the fuel cell apparatus 1, and may transmit and/or receive a signal to and/or from each component. For example, the controller 440 may process a signal received from each component provided in the fuel cell apparatus 1 (e.g. the flow meter 53, the humidity sensor 420, the first and second pressure gauges 423 and 424, the intake temperature sensor 421, and/or the stack temperature sensor 422), and may transmit a control signal obtained as the result of signal processing to components provided in the fuel cell apparatus 1 (e.g. the first three-way valve 400, a second three-way valve 410, a third three-way valve 430, the stack air blower 72, and/or the stack in valve 36 and the stack out valve 37) (see FIG. 17).

The controller 440 may control the first three-way valve 400 based on the value of the humidity of external air sensed by the humidity sensor 420 such that the opening amount of the portion of the exhaust channel 401 that supplies exhaust air to the humidifier 23 (i.e., the second exhaust channel 211b) and the opening amount of the first bypass channel 402 are inversely proportional to each other.

As one example, when the sensed humidity value is low, the controller 440 may control the first three-way valve 400 such that the second exhaust channel 211b is open 100% and the first bypass channel 402 is closed, whereby all exhaust air discharged from the stacks 20a and 20b is supplied to the humidifier 23, and therefore the humidity of external air to be supplied to the stacks 20a and 20b is raised.

As one example, when the sensed humidity value is high, the controller 440 may control the first three-way valve 400 such that the second exhaust channel 211b is open 20% and the first bypass channel 402 is open 80%, whereby the flow rate of exhaust air supplied from the stacks 20a and 20b to the humidifier 23 is decreased, and therefore the humidity of external air supplied to the stacks 20a and 20b is reduced.

If the relative humidity of external air supplied to the stacks 20a and 20b is lower than optimum humidity, the efficiency of power generation by the stacks 20a and 20b may be lowered.

If the relative humidity of external air to be supplied to the stacks 20a and 20b is higher than optimum humidity, condensation may easily occur in the stacks 20a and 20b, whereby a flooding phenomenon may occur. The flooding phenomenon is a phenomenon in which water gathers in the stacks 20a and 20b, due to which the area of the stacks 20a and 20b in which electrochemical reaction occurs may be decreased. Therefore, the efficiency of power generation by the stacks 20a and 20b may be lowered.

The controller 440 may control the first three-way valve 400 such that the relative humidity of external air to be supplied to the stacks 20a and 20b is maintained within an optimum humidity range, whereby the efficiency of power generation by the stacks 20a and 20b is not lowered.

Figure 2:
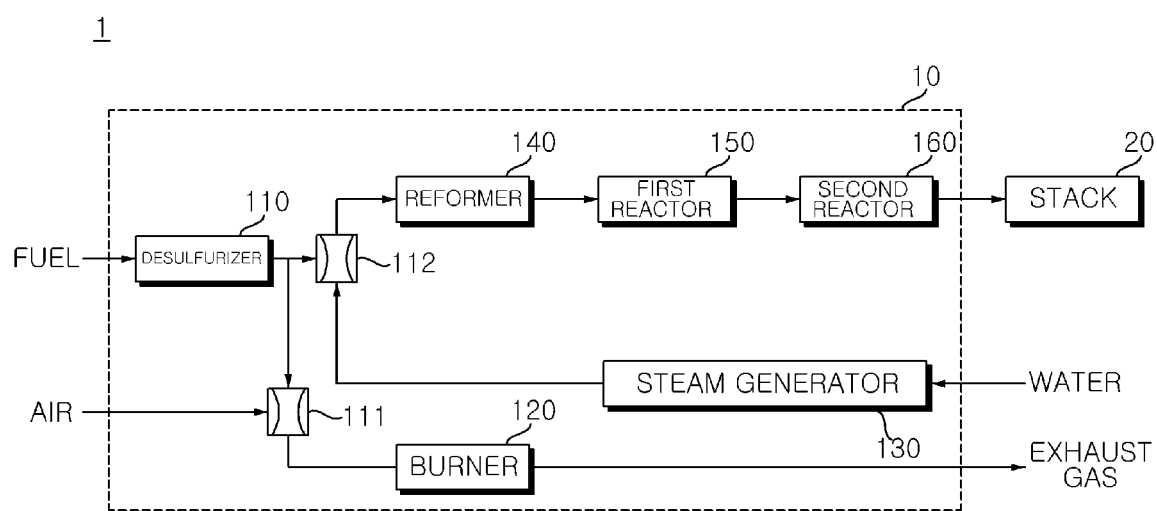
FIG. 2 is a view showing the construction of a fuel cell apparatus according to an embodiment of the present disclosure.

Other components of the fuel cell apparatus 1 according to the embodiment of the present disclosure may be described with reference to FIGS. 1 and 2. The fuel processing device 10 may include the desulfurizer 110, the burner 120, the steam generator 130, the reformer 140, the first reactor 150 and/or the second reactor 160. The fuel processing device 10 may further include at least one mixer 111 and 112. These components are each structural components of the fuel processing device 10.

The desulfurizer 110 may perform a desulfurization process of removing a sulfur compound from fuel gas. For example, the desulfurizer 110 may have an adsorbent provided therein. The sulfur compound included in fuel gas passing through the interior of the desulfurizer 110 may be adsorbed by the adsorbent.

The adsorbent may be constituted by a metal oxide, zeolite, or activated carbon. The desulfurizer 110 may include a filter configured to remove foreign matter from fuel gas.

The burner 120 may supply heat to the reformer 140 such that reforming reaction in the reformer 140 is accelerated. For example, fuel gas discharged from the desulfurizer 110 and air introduced from the outside may be mixed by the first mixer 111, and may be supplied to the burner 120.

The burner 120 may burn a mixture of the fuel gas and the air to generate heat of combustion. The internal temperature (or inner temperature) of the reformer 140 may be maintained at optimum temperature (e.g., 800° C.) by heat supplied from the burner 120.

Exhaust gas generated in the burner 120 as the result of combustion of the mixed gas may be discharged from the fuel processing device 10.

The steam generator 130 may evaporate water so as to be discharged as steam. For example, the steam generator 130 may absorb heat from exhaust gas generated in the burner 120 and from the first reactor 150 and/or the second reactor 160 to evaporate water.

The steam generator 130 may be disposed adjacent to the first reactor 150, the second reactor 160, and/or a pipe (or conduit) in which exhaust gas discharged from the burner 120 flows.

The first reactor 150 may reduce the amount of carbon monoxide generated by reforming reaction, among ingredients included in gas discharged from the reformer 140. For example, carbon monoxide included in gas discharged from the reformer 140 may react with steam in the first reactor 150, whereby carbon dioxide and hydrogen may be generated. The internal temperature of the first reactor 150 may be lower than the internal temperature of the reformer 140, and may be higher than room temperature (e.g., 200° C.).

The first reactor 150 may be called a shift reactor.

The second reactor 160 may reduce the amount of residual carbon monoxide, among ingredients included in gas discharged from the first reactor 150. For example, preferential oxidation (PROX), in which carbon monoxide included in gas discharged from the first reactor 150 reacts with oxygen, may occur in the second reactor 160.

In order for preferential oxidation, a large amount of oxygen may be necessary, and therefore additional supply of air may be required. However, hydrogen is diluted by the additionally supplied air, whereby the concentration of hydrogen supplied to the stacks 20a and 20b is lowered. In order to solve this, selective methanation, in which carbon monoxide and hydrogen react with each other, may be used.

A fuel valve 30 may be disposed in a fuel supply channel 101, in which fuel gas supplied from the fuel processing device 10 flows. The flow rate of fuel gas supplied to the fuel processing device 10 may be adjusted in response to the degree of opening of the fuel valve 30. For example, the fuel valve 30 may block the fuel supply channel 101 such that the supply of fuel gas to the fuel processing device 10 is interrupted.

A first fuel flow meter 51 configured to detect the flow rate of fuel gas flowing in the fuel supply channel 101 may be disposed in (or at) the fuel supply channel 101.

A burner air blower 71 may be connected to the main external air introduction channel 201 and a fuel-side air supply channel 202. The burner air blower 71 may blow air introduced from the outside through the main external air introduction channel 201 to the fuel processing device 10 through the fuel-side air supply channel 202.

The air introduced into the fuel processing device 10 through the fuel-side air supply channel 202 may be supplied to the burner 120 of the fuel processing device 10. For example, the air introduced into the fuel processing device 10 may be mixed with fuel gas discharged from the desulfurizer 110 in the first mixer 111, and may be supplied to the burner 120.

An air filter 91 configured to remove foreign matter, such as dust, from air and/or a first air-side check valve 81 configured to control an air flowing direction may be disposed in (or at) the main external air introduction channel 201.

A fuel processing unit I may include a first internal gas channel 102, through which fuel gas discharged from the desulfurizer 110 flows to the reformer 140. A proportional control valve 31, an internal fuel valve 32 configured to adjust the flow rate of fuel gas introduced into the reformer 140, a second fuel flow meter 52 configured to detect the flow rate of fuel gas flowing in the first internal gas channel 102, a fuel-side check valve 83 configured to control a flowing direction of fuel gas flowing in the first internal gas channel 102, and/or a sulfur detector 94 may be disposed in (or at) the first internal gas channel 102.

The proportional control valve 31 may adjust the flow rate, pressure, etc. of fuel gas discharged from the desulfurizer 110 and flowing to the reformer 140 through internal/external feedback in an electric control mode.

The sulfur detector 94 may detect sulfur included in fuel gas discharged from the desulfurizer 110. The sulfur detector 94 may include an indicator configured such that a color of the indicator is changed when the indicator reacts with a sulfur compound that has not been removed by the adsorbent of the desulfurizer 110. The indicator may include phenolphthalein or a molybdenum compound.

The fuel processing unit I may include a second internal gas channel 103, through which fuel gas discharged from the desulfurizer 110 flows to the burner 120. The burner 120 may use fuel gas introduced through the second internal gas channel 103 for combustion. The first internal gas channel 102 and the second internal gas channel 103 may communicate with each other.

The fuel processing device 10 may be connected to a water supply channel 303, in which water discharged from a water supply tank 13 flows. A water pump 38, a water supply valve 39 configured to adjust the flow rate of water, and/or a water flow meter 54 configured to detect the flow rate of water flowing in the water supply channel 303 may be disposed in (or at) the water supply channel 303.

Exhaust gas generated in the burner 120 (of the fuel processing device 10) may be discharged from the fuel processing device 10 through the exhaust gas discharge channel 210.

The fuel processing device 10 may be connected to a reformed gas discharge channel 104. Reformed gas discharged from the fuel processing device 10 may flow through the reformed gas discharge channel 104. The reformed gas discharge channel 104 may be connected to a reformed gas heat exchanger 21 in which heat exchange of reformed gas occurs. A reformed gas valve 33 configured to adjust the flow of reformed gas introduced into the reformed gas heat exchanger 21 may be disposed in (or at) the reformed gas discharge channel 104.

The reformed gas discharge channel 104 may communicate with a bypass channel 105, through which reformed gas discharged from the fuel processing device 10 flows to the fuel processing device 10. The bypass channel 105 may be connected to the fuel processing device 10. Reformed gas introduced into the fuel processing device 10 through the bypass channel 105 may be used as fuel for combustion by the burner 120. A bypass valve 34 configured to adjust the flow of reformed gas introduced into the fuel processing device 10 may be disposed in the bypass channel 105.

The reformed gas heat exchanger 21 may be connected to the reformed gas discharge channel 104, in which reformed gas discharged from the fuel processing device 10 flows. The reformed gas heat exchanger 21 may be connected to a coolant supply channel 304, in which water discharged from the water supply tank 13 flows. The reformed gas heat exchanger 21 may perform heat exchange between reformed gas introduced through the reformed gas discharge channel 104 and water supplied through the coolant supply channel 304.

A coolant pump 43 configured to pump water stored in the water supply tank 13 to the reformed gas heat exchanger 21 and/or a coolant flow meter 56 configured to detect the flow rate of water flowing in the coolant supply channel 304 may be disposed in (or at) the coolant supply channel 304.

The reformed gas heat exchanger 21 may be connected to a stack gas supply channel 106. Reformed gas discharged from the reformed gas heat exchanger 21 may flow to the stacks 20a and 20b through the stack gas supply channel 106.

A reformed gas moisture remover 61 configured to adjust the amount of moisture included in reformed gas may be disposed in the stack gas supply channel 106. Reformed gas introduced into the reformed gas moisture remover 61 may be discharged from the reformed gas moisture remover 61 after moisture is removed therefrom.

Condensate generated in the reformed gas moisture remover 61 may be discharged from the reformed gas moisture remover 61, and may flow to a first water collection channel 309. A first water collection valve 44 configured to adjust the flow of water may be disposed in (or at) the first water collection channel 309.

The plurality of stacks 20a and 20b may be connected to each other via a gas connection channel 107. Reformed gas discharged from the first stack 20a without reaction may be introduced into the second stack 20b through the gas connection channel 107.

An additional moisture remover 62 configured to remove water generated as the result of condensation during passage of reformed gas through the first stack 20a may be disposed in (or at) the gas connection channel 107.

Water generated in the additional moisture remover 62 may be discharged from the additional moisture remover 62, and may flow to a second water collection channel 310. A second water collection valve 45 configured to adjust the flow of water may be disposed in the second water collection channel 310. The second water collection channel 310 may be connected to the first water collection channel 309.

Anode off gas (AOG) discharged from the stacks 20a and 20b without reaction may flow through a stack gas discharge channel 108.

The AOG heat exchanger 22 may be connected to the stack gas discharge channel 108, in which anode off gas (AOG) discharged from the stacks 20a and 20b flows. The AOG heat exchanger 22 may be connected to a hot water supply channel 313, in which water discharged from a heat collection tank 15 flows. The AOG heat exchanger 22 may perform heat exchange between anode off gas (AOG) introduced through the stack gas discharge channel 108 and water supplied through the hot water supply channel 313.

A hot water pump 48 configured to pump water stored in the heat collection tank 15 to the AOG heat exchanger 22 and/or a hot water flow meter 55 configured to detect the flow rate of water flowing in the hot water supply channel 313 may be disposed in (or at) the hot water supply channel 313.

The AOG heat exchanger 22 may be connected to an AOG supply channel 109, and may discharge heat-exchanged anode off gas (AOG) through the AOG supply channel 109. The anode off gas (AOG) discharged from the AOG heat exchanger 22 may flow to the fuel processing device 10 through the AOG supply channel 109. The anode off gas (AOG) supplied to the fuel processing device 10 through the AOG supply channel 109 may be used as fuel for combustion by the burner 120.

An AOG moisture remover 63 configured to adjust the amount of moisture included in anode off gas (AOG) and/or an AOG valve 35 configured to adjust the flow of anode off gas (AOG) supplied to the fuel processing device 10 may be disposed in (or at) the AOG supply channel 109. Anode off gas (AOG) introduced into the AOG moisture remover 63 may be discharged from the AOG moisture remover 63 after moisture is removed therefrom.

Condensate generated in the AOG moisture remover 63 may be discharged from the AOG moisture remover 63, and may flow through a third water collection channel 311. A third water collection valve 46 configured to adjust the flow of water may be disposed in (or at) the third water collection channel 311. The third water collection channel 311 may be connected to the first water collection channel 309.

The water supply tank 13 may be connected to a water introduction channel 301, and the water supply tank 13 may store water supplied through the water introduction channel 301. A first liquid filter 92 configured to remove foreign matter from water supplied from the outside and/or a water introduction valve 41 configured to adjust the flow of water introduced into the water supply tank 13 may be disposed in the water introduction channel 301.

The water supply tank 13 may be connected to a water discharge channel 302, and may discharge at least some of the water stored in the water supply tank 13 to the outside through the water discharge channel 302. A water discharge valve 42 configured to adjust the flow of water discharged from the water supply tank 13 may be disposed in (or at) the water discharge channel 302.

The water supply tank 13 may be connected to a water storage channel 308, and may store water flowing through the water storage channel 308. For example, water discharged from the reformed gas moisture remover 61, the additional moisture remover 62, the AOG moisture remover 63, and/or the air moisture remover 64 and flowing through the third water collection channel 311 may be introduced into the water supply tank 13 via the water storage channel 308. A second liquid filter 93 configured to remove foreign matter from water collected from the water supply tank 13 may be disposed in (or at) the water storage channel 308.

At least some of the water stored in the water supply tank 13 may flow to the reformed gas heat exchanger 21 by the coolant pump 43, and may exchange heat with reformed gas in the reformed gas heat exchanger 21. Water discharged from the reformed gas heat exchanger 21 may be introduced into the stacks 20a and 20b through the stack water supply channel 305.

Coolant introduced into the stacks 20a and 20b through the stack water supply channel 305 may cool the stacks 20a and 20b. The coolant introduced into the stacks 20a and 20b may flow along stack heat exchangers included in the stacks 20a and 20b, and may absorb heat generated by electrochemical reaction occurring in the stacks 20a and 20b.

Coolant discharged from the stacks 20*a* and 20*b* may be introduced into a coolant heat exchanger 24 through the stack water discharge channel 307. The coolant heat exchanger 24 may perform heat exchange between the coolant discharged from the stacks 20*a* and 20*b* and coolant discharged from the heat collection tank 15. The coolant discharged from the stacks 20*a* and 20*b* may flow to the water storage channel 308 via the coolant heat exchanger 24.

The plurality of stacks 20*a* and 20*b* may be connected to each other via a water connection channel 306. Water discharged from the first stack 20*a* may be introduced into the second stack 20*b* through the water connection channel 306.

Water discharged from the heat collection tank 15 by the hot water pump 48 may be introduced into the AOG heat exchanger 22 via the hot water supply channel 313. Water heat-exchanged with anode off gas (AOG) in the AOG heat exchanger 22 may be discharged to a first hot water circulation channel 314.

The coolant heat exchanger 24 may perform heat exchange between water introduced through the stack water discharge channel 307 and water introduced through a second hot water circulation channel 315.

The exhaust heat exchanger 26 may be connected to the exhaust gas discharge channel 210 in which exhaust gas flows. The exhaust heat exchanger 26 may be connected to a third hot water circulation channel 316 in which water discharged from the coolant heat exchanger 24 flows. The exhaust heat exchanger 26 may perform heat exchange between exhaust gas and exhaust air introduced through the exhaust gas discharge channel 210 and water introduced through the third hot water circulation channel 316. The exhaust gas and the exhaust air heat-exchanged in the exhaust heat exchanger 26 may be discharged to the outside through the second air discharge channel 213*b*. The water heat-exchanged in the exhaust heat exchanger 26 may be discharged to a hot water collection channel 317, and the water flowing in the hot water collection channel 317 may be introduced into the heat collection tank 15.

The air heat exchanger 25 may be connected to the first hot water circulation circuit 314, in which water discharged from the AOG heat exchanger 22 flows. The air heat exchanger 25 may perform heat exchange between exhaust air introduced through the humidifier discharge channel 212 and water introduced through the first hot water circulation circuit 314. The water heat-exchanged in the air heat exchanger 25 may be discharged from the air heat exchanger 25 through the second hot water circulation channel 315. The water discharged from the air heat exchanger 25 may be introduced into the coolant heat exchanger 24 through the second hot water circulation channel 315.

The air moisture remover 64 disposed in (or at) the air discharge channel 213 may adjust the amount of moisture included in exhaust air discharged to the outside. Exhaust air introduced into the air moisture remover 64 may be discharged from the air moisture remover 64 after moisture is removed therefrom.

Condensate generated in the air moisture remover 64 may be discharged from the air moisture remover 64, and may flow through a fourth water collection channel 312. A fourth water collection valve 47 configured to adjust the flow of water may be disposed in the fourth water collection channel 312. The fourth water collection channel 312 may be connected to the water storage channel 308.

The fuel cell apparatus 1 according to a first embodiment of the present disclosure may be described with reference to FIG. 3. The fuel cell apparatus 1 according to the first embodiment may include a second bypass channel 412 branched from the first intake channel 204 and joined to the second intake channel 205 and a second three-way valve 410 disposed at the portion of the first intake channel 204 from which the second bypass channel 412 is branched. The second bypass channel 412 may allow external air discharged from the stack air blower 72 to bypass the humidifier 23 so as to be directly supplied to the second intake channel 205.

The second three-way valve 410 may be disposed at the portion of the first intake channel 204 from which the second bypass channel 412 is branched so as to separate (or divide) the first intake channel 204 into a front end and a rear end.

The front end 204*a* of the first intake channel 204 may connect the stack air blower 72 to the second three-way valve 410 such that external air discharged from the stack air blower 72 is supplied to the second three-way valve 410. The rear end 204*b* of the first intake channel 204 may connect the second three-way valve 410 to the humidifier 23 such that external air discharged from the second three-way valve 410 is supplied to the humidifier 23.

The second three-way valve 410 may close the second bypass channel 412 in proportion to the degree of opening of the rear end 204*b* of the first intake channel 204. That is, the second three-way valve 410 may allow the opening amount of the rear end 204*b* of the first intake channel 204 and the opening amount of the second bypass channel 412 to be inversely proportional to each other.

As one example, when the rear end 204*b* (of the first intake channel) is open 70%, the second bypass channel 412 may be open 30%. At this time, about 70% of external air supplied to the second three-way valve 410 may be supplied to the rear end 204*b* (of the first intake channel), and the remainder of the external air (i.e., about 30% of the external air) may be supplied to the second bypass channel 412.

As one example, when the rear end 204*b* (of the first intake channel) is open 100%, the second bypass channel 412 may be closed. At this time, all external air supplied to the second three-way valve 410 may be supplied to the rear end 204*b* (of the first intake channel).

The humidity sensor 420 may be disposed downstream of the point of the second intake channel 205 at which the second bypass channel 412 is joined. The humidity sensor 420 may sense the humidity (or humidity value) of external air discharged from the humidifier 23. Alternatively, the humidity sensor 420 may sense the humidity (or humidity value) of a mixture of external air discharged from the humidifier 23 and external air to be supplied to the second intake channel 205 as the result of bypassing the humidifier 23.

The controller 440 may control the second three-way valve 410 based on the value of the humidity of external air sensed by the humidity sensor 420 such that the opening amount of the portion of the first intake channel 204 that supplies exhaust air to the humidifier 23 (i.e., the rear end 204*b* of the first intake channel) and the opening amount of the second bypass channel 412 are inversely proportional to each other.

As one example, when the sensed humidity value is low, the controller 440 may control the second three-way valve 410 such that the rear end 204*b* (of the first intake channel) is open 100% and the second bypass channel 412 is closed, whereby all external air discharged from the stack air blower 72 passes through the humidifier 23 so as to be humidified and is then supplied to the stacks 20*a* and 20*b*.

As one example, when the sensed humidity value is high, the controller 440 may control the second three-way valve

410 such that the portion of the first intake channel 204 is open 20% and the second bypass channel 412 is open 80%, whereby the amount of the portion of exhaust air discharged from the stack air blower 72 that passes through the humidifier 23 is decreased, and therefore the humidity of external air introduced into the stacks 20a and 20b is decreased.

The controller 440 may control the first three-way valve 400 and the second three-way valve 410 to prevent lowering in efficiency of power generation by the stacks 20a and 20b due to low relative humidity of external air supplied to the stacks 20a and 20b and to prevent a flooding phenomenon due to high relative humidity of external air supplied to the stacks 20a and 20b and lowering in efficiency of power generation by the stacks 20a and 20b due to the flooding phenomenon.

A method of controlling the fuel cell apparatus 1 according to the first embodiment may be described with reference to FIGS. 3 to 8. When driving of the fuel cell apparatus 1 is started (S1), a user may set a target power generation amount (S2).

The user setting of the target power generation amount (S2) may be setting of a target amount of electrical energy generated by the stacks 20a and 20b through electrochemical reaction in a power generation mode. As the user's target power generation amount is set to be higher, a larger amount of external air may need to be supplied to the stacks 20a and 20b.

When the user's target power generation amount is set, the controller 440 may switch the valves to initial states thereof (S3). The controller 440 may switch the first three-way valve 400 to the humidifier 23 to close the first bypass channel 402. The controller 440 may switch the second three-way valve 410 to the humidifier 23 to close the second bypass channel 412. However, these are initial states arbitrarily set in the controller 440, and initial positions of the valve may be changed depending on setting.

Additionally, the controller 440 may close the stack in valve 36 and the stack out valve 37. This may prevent introduction of foreign matter into the stacks 20a and 20b.

A preheating operation mode may be executed (S4) in which the burner air blower 71 suctions external air and supplies the suctioned external air to the burner 120, fuel is supplied to the burner 120, and the burner 120 is operated to burn the fuel and the external air to preheat the reformer 140.

During execution of the preheating operation mode, the controller 440 may compare the internal temperature of the reformer with a set reformer temperature (S5).

The internal temperature of the reformer may be a value sensed by a temperature sensor disposed in the reformer. The set reformer temperature may be temperature suitable for the reformer to generate reformed gas, which may be a value preset and stored in the controller 440.

When the internal temperature (or inner temperature) of the reformer reaches the set reformer temperature, a reforming operation mode may be executed (S6) in which fuel and steam are supplied to the reformer 140 and the reformer 140 reforms the fuel and the steam to generate reformed gas.

In the reforming operation mode, reformed gas generated by the reformer may be supplied to the burner so as to be used for combustion. For example, the controller 440 may close the reformed gas valve 33 and may open the bypass valve 34.

A description of the desulfurizer, the mixer, and the steam generator in connection with the fuel and the steam supplied to the reformer may be same as the above description, and a further description thus may be omitted.

The controller 440 may compare the carbon monoxide (CO) concentration of reformed gas generated by the reformer with a set concentration (S7).

The (CO) concentration of reformed gas may be a value sensed by a concentration sensor in the reformer or in the outlet of the reformer. The set concentration may be a CO concentration suitable for reformed gas to be supplied to the stacks 20a and 20b such that electrochemical reaction occurs, which may be a value preset and stored in the controller 440.

When the CO concentration of reformed gas is reduced to the set concentration, a power generation operation mode may be executed (S8) in which external air and reformed gas are supplied to the stacks 20a and 20b such that electrical energy is generated through electrochemical reaction.

The controller 440 may control the stack air blower 72 to supply external air to the stacks 20a and 20b. The controller 440 may open the stack in valve 36 and the stack out valve 37 such that external air is supplied to the stacks 20a and 20b and exhaust air is discharged from the stacks 20a and 20b.

The controller 440 may open the reformed gas valve 33 and may close the bypass valve 34 such that reformed gas generated by the reformer is supplied to the stacks 20a and 20b.

In the stacks 20a and 20b, electrochemical reaction may occur between oxygen contained in the supplied external air and hydrogen contained in the reformed gas, thus generating electrical energy and moisture. The generated moisture may be contained in exhaust air discharged from the stacks 20a and 20b.

The controller 440 may determine whether user setting on whether the fuel cell apparatus 1 will control the humidity of external air supplied to the stacks 20a and 20b is turned on (S9). When the user setting on whether to control the humidity is turned on, entry into a humidity control mode corresponding to operations S10 to S15 is performed.

When entry into the humidity control mode is performed, the controller 440 may receive the humidity Hn (or humidity value) of external air supplied to the stacks 20a and 20b, sensed by the humidity sensor 420 (S10).

The controller 440 may determine whether the received measured humidity value Hn is equal to or greater than a lower limit humidity value Hl and is equal to or less than an upper limit humidity value Hh, is less than the lower limit humidity value Hl, or is greater than the upper limit humidity value Hh (S11).

The lower limit humidity value Hl may be a lower limit value of a humidity range of external air suitable for electrochemical reaction of the stacks 20a and 20b, which may be a value pre-stored in the controller 440. If the humidity of external air to be supplied to the stacks 20a and 20b is less than the lower limit humidity value Hl, efficiency of power generation by the stacks 20a and 20b may be lowered. For example, the lower limit humidity value Hl may be a relative humidity of 70%. Other values may also be provided.

The upper limit humidity value Hh may be an upper limit value of a humidity range of external air suitable for electrochemical reaction of the stacks 20a and 20b, which may be a value pre-stored in the controller 440. If the humidity of external air to be supplied to the stacks 20a and 20b is less than the upper limit humidity value Hh, condensation may easily occur in the stacks 20a and 20b, whereby a flooding phenomenon may occur, and therefore efficiency of power generation by the stacks 20a and 20b may be lowered. For example, the upper limit humidity value Hh may be a relative humidity of 80%.

A range between the lower limit humidity value Hl and the upper limit humidity value Hh may be called an optimum humidity range.

When the measured humidity value Hn is less than the lower limit humidity value Hl, the controller 440 may switch the first three-way valve 400 and/or the second three-way valve 410 to a humidification mode, or may maintain positions of the first three-way valve 400 and/or the second three-way valve 410 switched to the humidification mode (S12b).

The humidification mode is a mode in which the controller 440 controls the first three-way valve 400 and/or the second three-way valve 410 such that the humidity of external air supplied to the stacks 20a and 20b is raised to the optimum humidity range.

Figure 3:
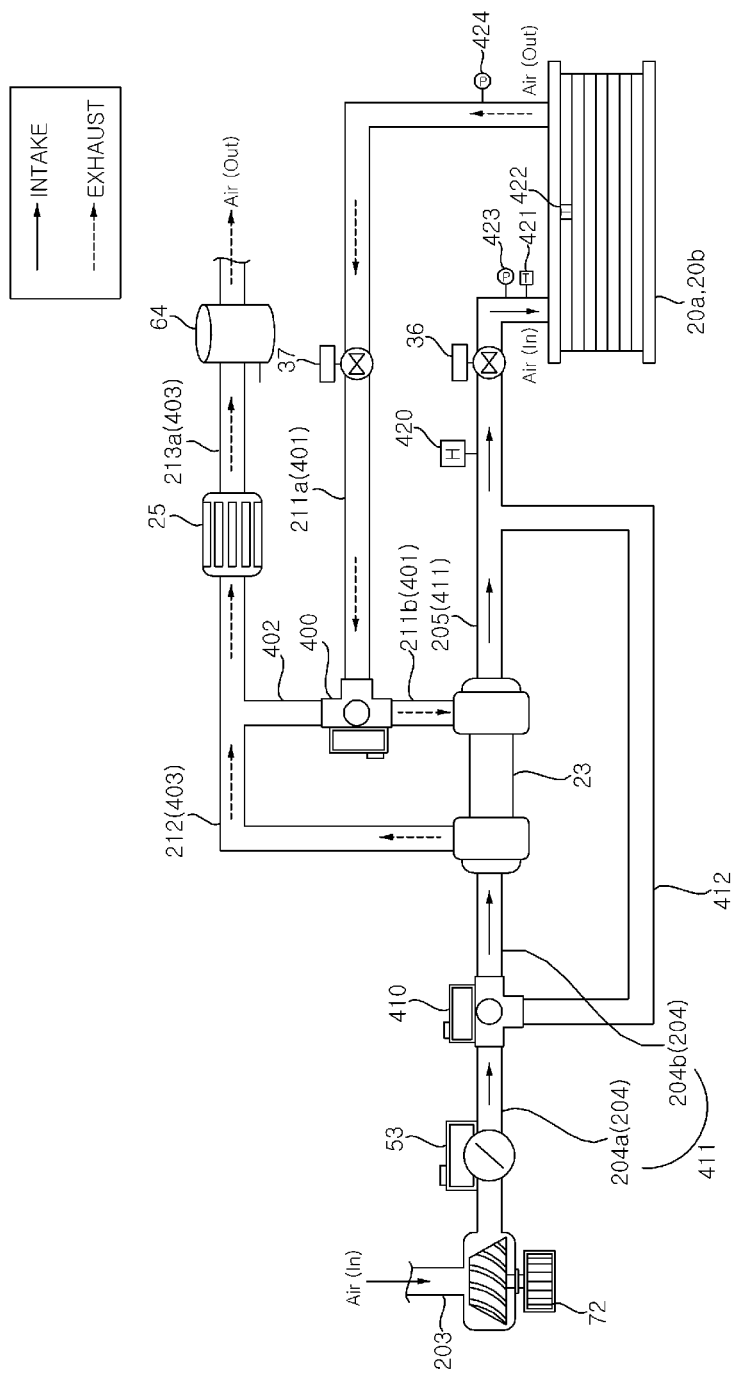
FIG. 3 is a view showing a flow in a humidification mode according to a first embodiment of the present disclosure.

As one example, when the humidity value of external air sensed by the humidity sensor 420 is less than the set lower limit humidity value Hl, the controller 440 may control the first three-way valve 400 such that the first bypass channel 402 is closed, and may control the second three-way valve 410 such that the second bypass channel 412 is closed (see FIG. 3).

When the first three-way valve 400 is switched to the humidifier 23 (or maintained to the humidifier 23) such that the first bypass channel 402 is closed and the second exhaust channel 211b is open 100%, all exhaust air discharged from the stacks 20a and 20b may be supplied to the humidifier 23 through the first exhaust channel 211a and the second exhaust channel 211b.

When the second three-way valve 410 is switched (or maintained) to the humidifier 23 such that the second bypass channel 412 is closed and the first intake channel 204 is open 100%, all external air discharged from the stack air blower 72 may be supplied to the humidifier 23 through the front end of the first intake channel 204 and the rear end of the first intake channel 204.

The humidifier 23 may extract moisture contained in exhaust air, and may supply the extracted moisture to external air. All exhaust air discharged from the stacks 20a and 20b may be supplied to the humidifier 23 such that moisture is extracted therefrom, such that the humidity of external air passing through the humidifier 23 may be further raised.

The external air humidified by the humidifier 23 may be supplied to the stacks 20a and 20b through the second intake channel 205. The exhaust air dehumidified by the humidifier 23 may be discharged to the outside through the discharge channel 403.

In the humidification mode all external air discharged from the stack air blower 72 and all exhaust air discharged from the stacks 20a and 20b may be supplied to the humidifier 23 such that the humidity of external air to be supplied to the stacks 20a and 20b may be raised to the optimum humidity range.

When the measured humidity value Hn is greater than the upper limit humidity value Hh, the controller 440 may switch the first three-way valve 400 and/or the second three-way valve 410 to a dehumidification mode, or may maintain positions of the first three-way valve 400 and/or the second three-way valve 410 switched to (or provided into) the dehumidification mode (S12c).

The dehumidification mode is a mode in which the controller 440 controls the first three-way valve 400 and the second three-way valve 410 such that the humidity of external air supplied to the stacks 20a and 20b is reduced to the optimum humidity range.

Figure 5:
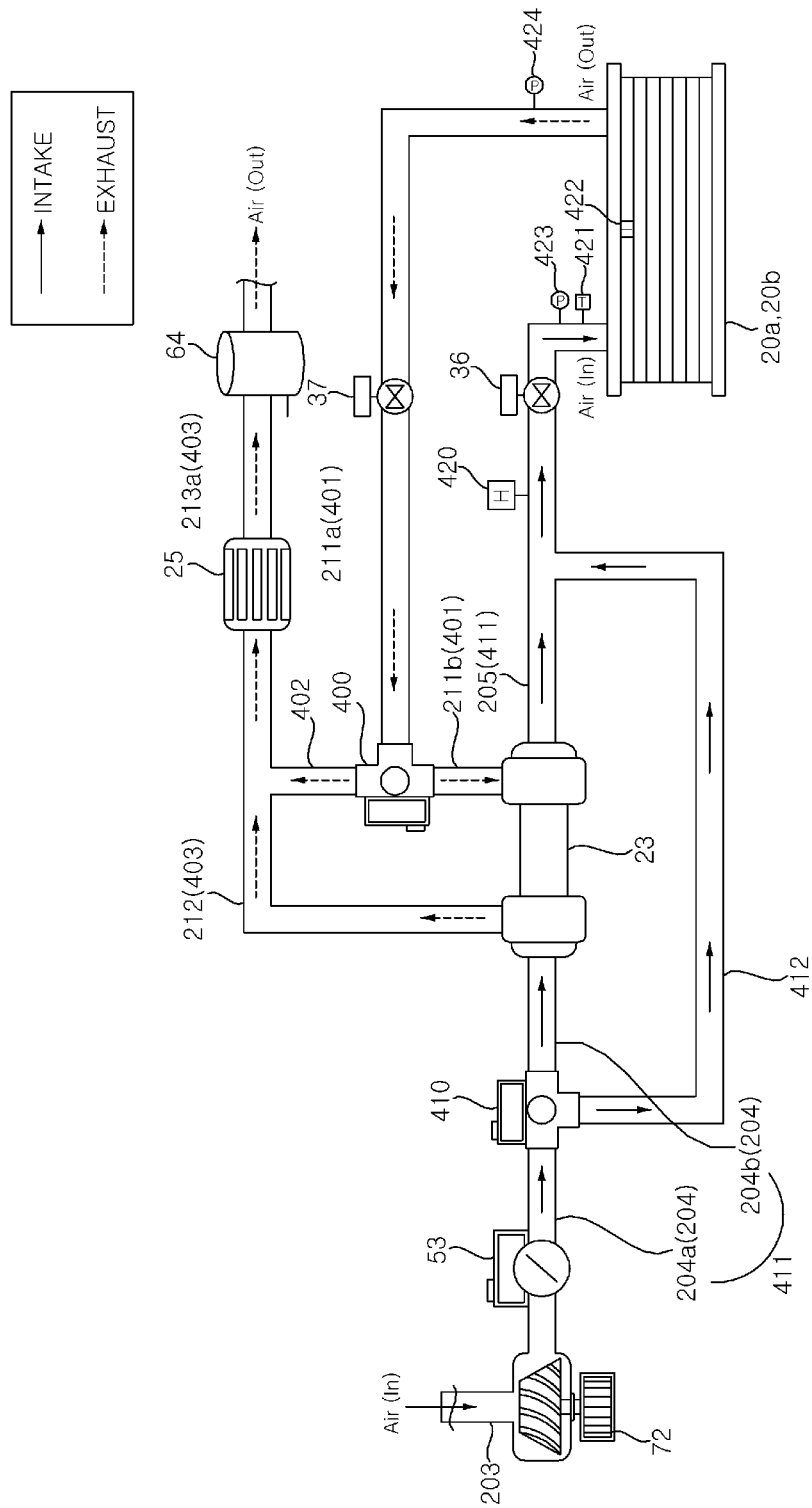
FIG. 5 is a view showing a flow in a dehumidification mode according to a first embodiment of the present disclosure.
Figure 6:
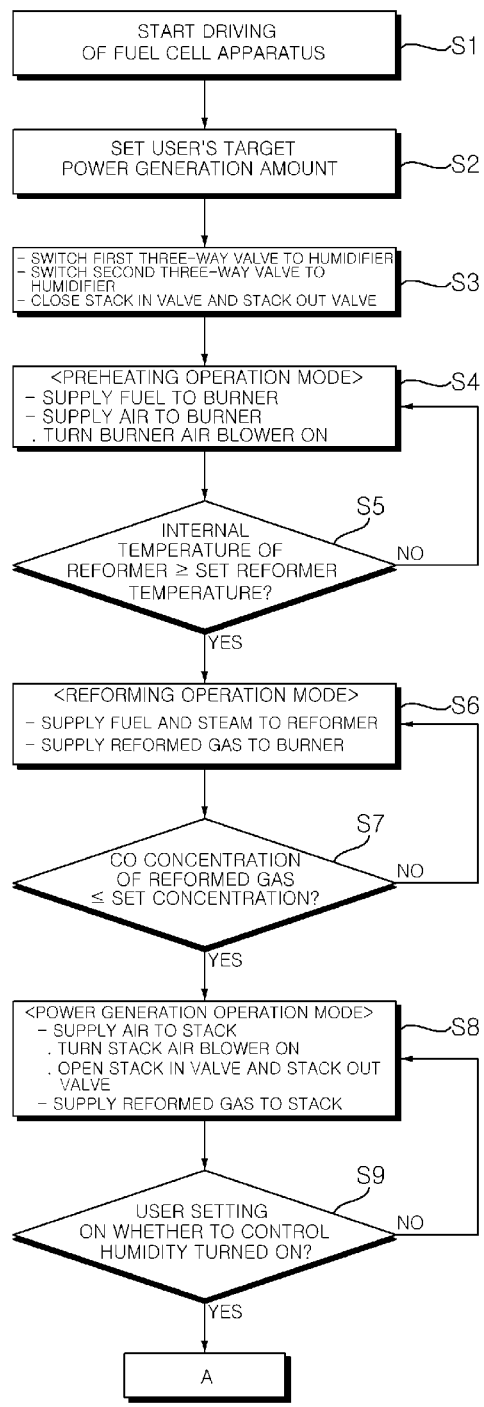
FIGS. 6 and 7 are control flowcharts according to a first embodiment of the present disclosure.
Figure 7:
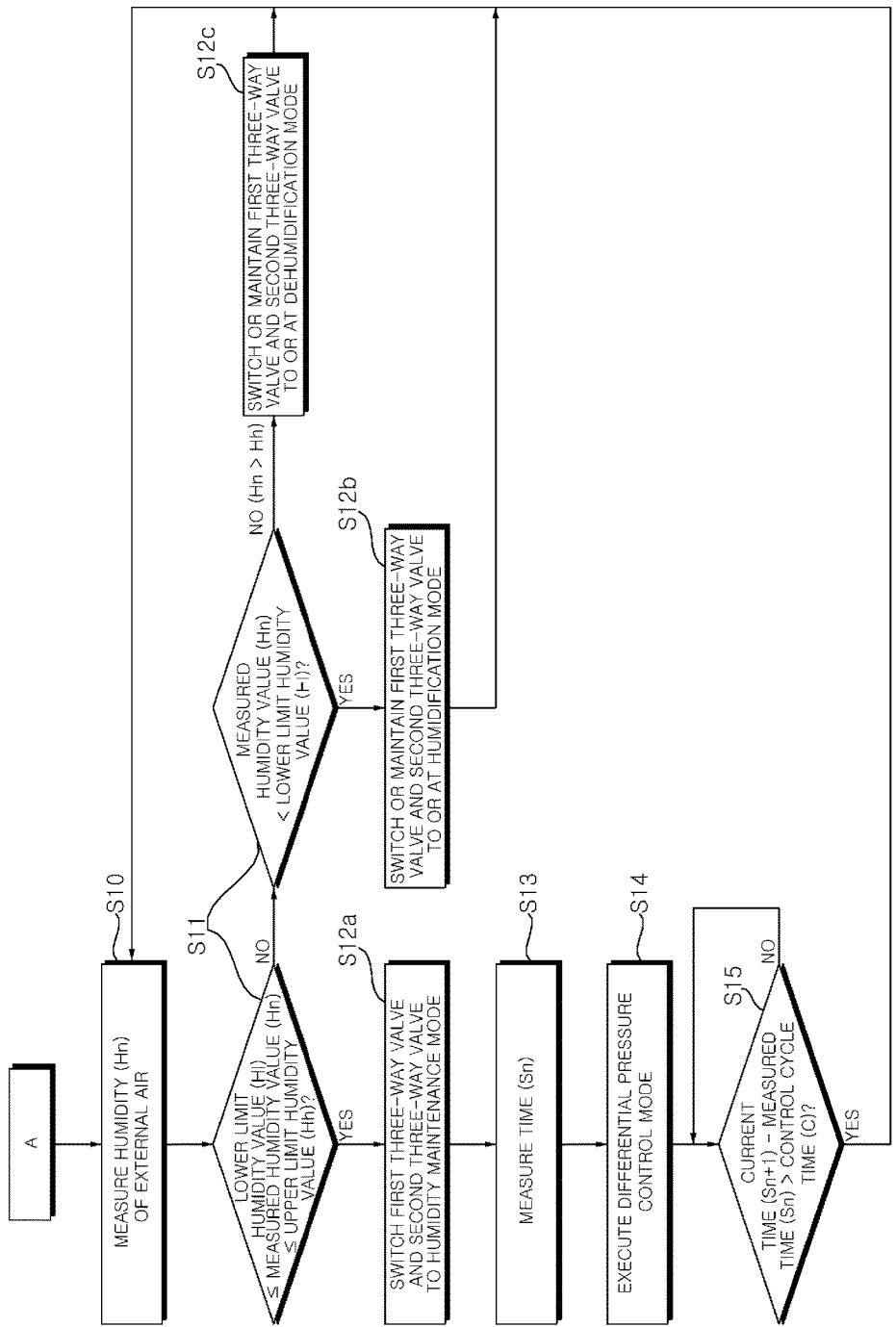

As one example, when the humidity value of external air sensed by the humidity sensor 420 is greater than the set upper limit humidity value, the controller 440 may control the first three-way valve 400 such that the first bypass channel 402 is open to a set second opening amount, and may control the second three-way valve 410 such that the second bypass channel 412 is open to a third opening amount determined so as to be proportional to the humidity value of external air (see FIG. 5).

The second opening amount may be an upper limit opening amount to which the first bypass channel 402 can be open, which may be a value preset and stored in the controller 440. For example, the second opening amount may be 80%. At this time, the second opening amount may be set to 80% such that the second exhaust channel 211b is open 20% in the dehumidification mode.

The upper limit is set to the opening amount to which the first bypass channel 402 can be open in the dehumidification mode, as described above, in order to maintain minimum humidity necessary for power generation by the stacks 20a and 20b even when the humidity value of external air is rapidly decreased due to various external factors during execution of the dehumidification mode.

The third opening amount may be an opening amount proportional to the humidity value of external air in order to rapidly decrease the humidity value of external air to the optimum humidity range when the humidity value of external air is greater than the upper limit humidity value Hh, which may be a value preset and stored in the controller 440.

As one example, when the upper limit humidity value Hh is 80% and the humidity value of external air is 80%, the third opening amount may be 0%. As one example, when the upper limit humidity value Hh is 80% and the humidity value of external air is 90%, the third opening amount may be 50%. As one example, when the upper limit humidity value Hh is 80% and the humidity value of external air is 100%, the third opening amount may be 100%.

The third opening amount may be set so as to be increased in proportion to the humidity value of external air does not include only the example in which a rate of rise of the third opening amount is uniform. That is, the third opening amount may be adjusted in various manners in terms of adjusting the amount of exhaust air supplied to the humidifier 23 in order to lower the humidity of external air to be supplied to the stacks 20a and 20b.

As one example, the third opening amount may also be set such that the rate of rise of the third opening amount is increased as the humidity value of external air becomes more distant from the upper limit humidity value Hh.

When the first bypass channel 402 is open based on the second opening amount and the second exhaust channel 211b is closed at the same percentage as the second opening amount, exhaust air of the percentage corresponding to the second opening amount, in exhaust air supplied to the first three-way valve 400, may be discharged to the outside through the first bypass channel 402, and exhaust air of the remaining percentage may be supplied to the humidifier 23 through the second exhaust channel 211b.

When the second bypass channel 412 is open based on the third opening amount and the rear end of the first intake channel 204 is closed at the same percentage as the third opening amount, external air of the percentage corresponding to the third opening amount, in external air supplied to the second three-way valve 410, may bypass the humidifier 23 and may then be directly supplied to the second intake channel 205 through the second bypass channel 412, and external air of the remaining percentage may be supplied to the humidifier 23 through the rear end of the first intake channel 204.

External air humidified by the humidifier 23 may be supplied to the stacks 20a and 20b through the second intake channel 205 together with external air that has bypassed the humidifier 23. Exhaust air dehumidified by the humidifier 23 may be discharged to the outside through the discharge channel 403 together with exhaust air that has bypassed the humidifier 23.

In the dehumidification mode the amount of external air supplied to the humidifier 23 and the amount of exhaust air supplied to the humidifier 23 may be reduced such that the humidity of external air to be supplied to the stacks 20a and 20b may be reduced to the optimum humidity range.

The controller 440 may switch (or maintain) the first three-way valve 400 and/or the second three-way valve 410 to the humidification mode or the dehumidification mode, and may return to operation S10 in order to measure the humidity of external air supplied to the stacks 20a and 20b.

The controller 440 may repeatedly perform the external air humidity measurement operation (S10) to the humidification operation (S12b) or the dehumidification operation (S12c) such that the humidity of external air is within the optimum humidity range suitable for power generation by the stacks 20a and 20b.

When the measured humidity value Hn is equal to or greater than the lower limit humidity value Hl and is equal to or less than the upper limit humidity value Hh, the controller 440 may switch (or maintain) the first three-way valve 400 and/or the second three-way valve 410 to a humidity maintenance mode (S12a).

The humidity maintenance mode is a mode in which the controller 440 controls the first three-way valve 400 and the second three-way valve 410 such that the humidity of external air supplied to the stacks 20a and 20b is maintained within the optimum humidity range.

Figure 4:
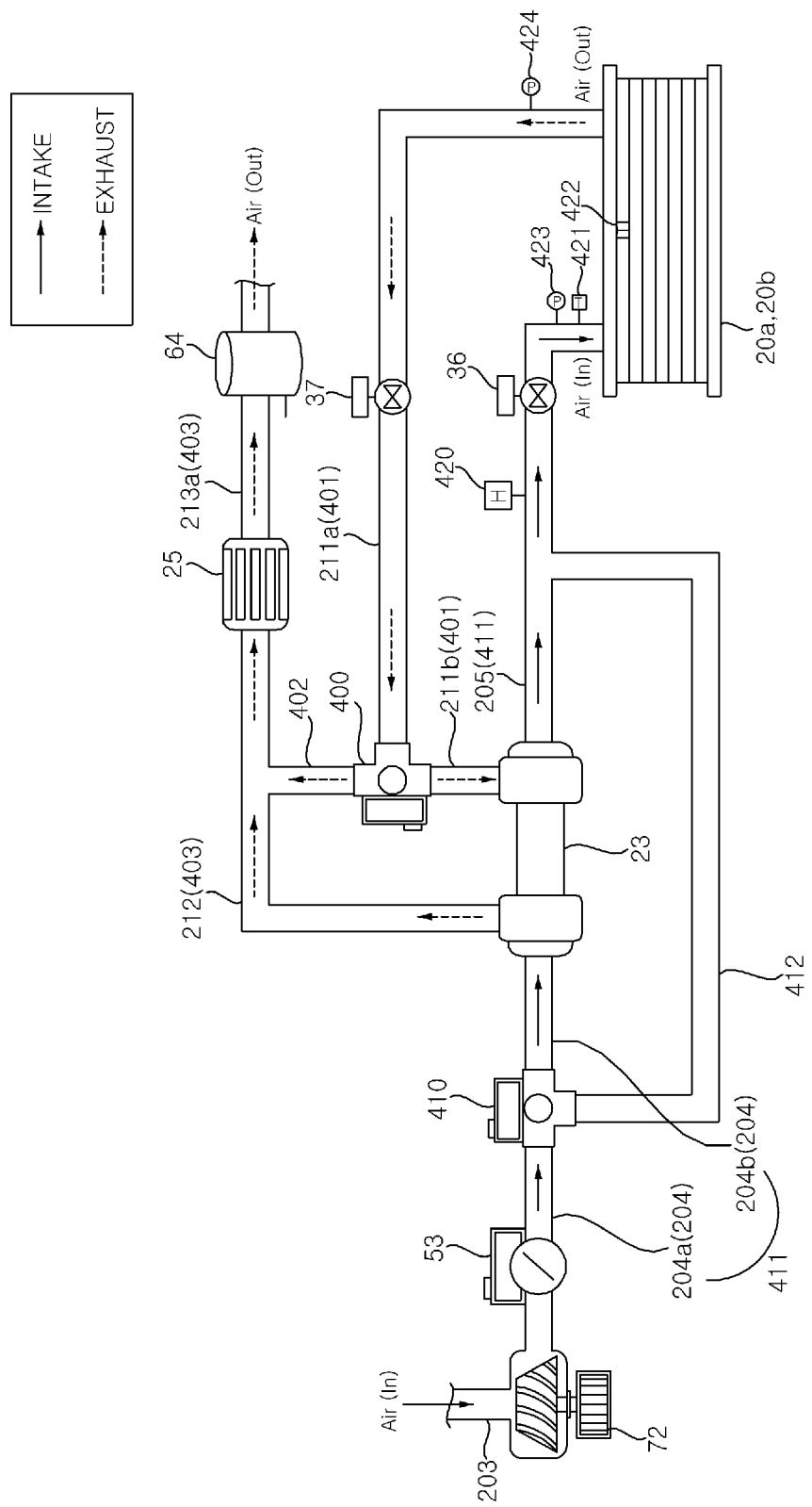
FIG. 4 is a view showing a flow in a humidity retention mode according to a first embodiment of the present disclosure.

As one example, when the humidity value of external air sensed by the humidity sensor 420 is equal to or greater than the set lower limit humidity value Hl and is equal to or less than the set upper limit humidity value Hh, the controller 440 may control the first three-way valve 400 such that the first bypass channel 402 is open to the first opening amount determined so as to be proportional to the humidity value of external air, and may control the second three-way valve 410 such that the second bypass channel 412 is closed (see FIG. 4).

The first opening amount may be an opening amount proportional to the humidity value of external air in order to inhibit an increase in the humidity value of external air as the humidity value of external air approximates the upper limit humidity value Hh and to inhibit a decrease in the humidity value of external air as the humidity value of external air approximates the lower limit humidity value, which may be a value preset and stored in the controller 440.

As one example, when the lower limit humidity value is 70% and the humidity value of external air is 70%, the first opening amount may be 0%. As one example, when the upper limit humidity value Hh is 80% and the humidity value of external air is 80%, the first opening amount may be equal to the second opening amount.

The first opening amount may have the set second opening amount as an upper limit. The reason that an upper limit is set to the opening amount of the first bypass channel 402 in the humidity maintenance mode is to maintain minimum humidity necessary for power generation by the stacks 20a and 20b even when the humidity value of external air is rapidly decreased due to various external factors during execution of the humidity maintenance mode. As one example, the second opening amount may be 80%.

The first opening amount may be set so as to be increased in proportion to the humidity value of external air does not mean only that a rate of rise of the first opening amount is uniform. That is, the first opening amount may be adjusted in various manners in terms of adjusting the amount of exhaust air supplied to the humidifier 23 in order to maintain the humidity of external air to be supplied to the stacks 20a and 20b within the optimum humidity range.

As one example, the first opening amount may also be set such that the rate of rise of the first opening amount is increased as the humidity value of external air approximates the upper limit humidity value Hh. As one example, the first opening amount may also be set such that the rate of rise of the first opening amount is decreased as the humidity value of external air approximates the lower limit humidity value.

When the first bypass channel 402 is open to the first opening amount and the second exhaust channel 211b is closed at the same percentage as the first opening amount, exhaust air of the percentage corresponding to the first opening amount, in exhaust air supplied to the first three-way valve 400, may be discharged to the outside through the first bypass channel 402, and exhaust air of the remaining percentage may be supplied to the humidifier 23 through the second exhaust channel 211b.

When the second bypass channel 412 is closed and the rear end of the first intake channel 204 is open 100%, all external air supplied to the second three-way valve 410 may be supplied to the humidifier 23 through the rear end of the first intake channel 204.

External air humidified by the humidifier 23 may be supplied to the stacks 20a and 20b through the second intake channel 205. Exhaust air dehumidified by the humidifier 23 may be discharged to the outside through the discharge channel 403 together with exhaust air that has bypassed the humidifier 23.

In the humidity maintenance mode, the amount of exhaust air supplied to the humidifier 23 may be appropriately adjusted, such that the humidity of external air supplied to the stacks 20a and 20b may be maintained within the optimum humidity range.

The controller 440 may measure time Sn during which the first three-way valve 400 and the second three-way valve 410 have been switched to the humidity maintenance mode (S13) (or maintained in the humidity maintenance mode).

Figure 8:
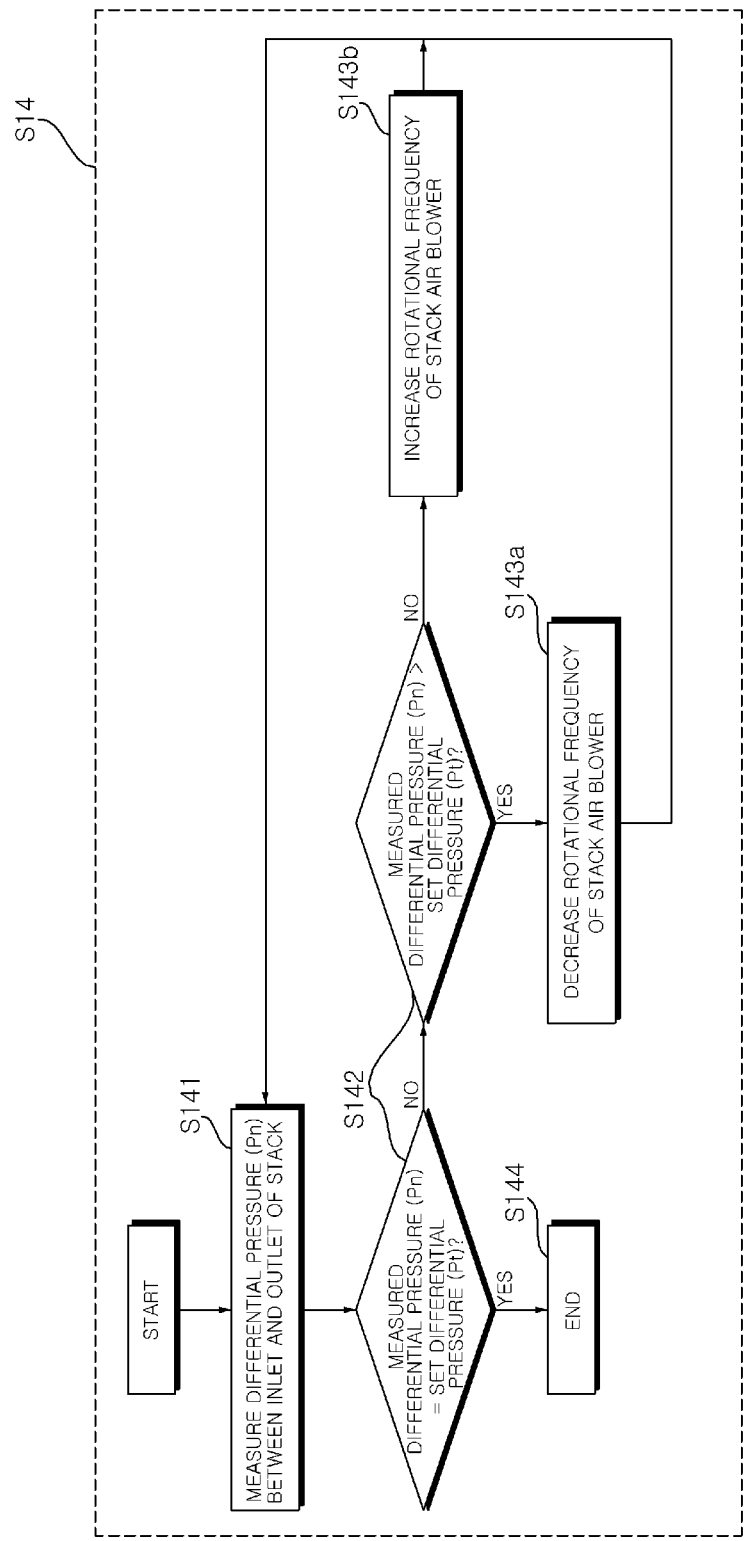
FIG. 8 is a control flowchart in a differential pressure control mode according to an embodiment of the present disclosure.

The controller 440 may execute a differential pressure control mode for compensating for differential pressure changed as the result of switching of the first three-way valve 400 and the second three-way valve 410 (S14) (see FIG. 8). The differential pressure control mode is a mode in which the controller 440 controls rotational frequency of the stack air blower 72 to maintain the pressure difference between an external air inlet and an exhaust air outlet of the stacks 20a and 20b at an optimum value such that an appropriate amount of external air necessary for power generation by the stacks 20a and 20b is introduced into the stacks 20a and 20b.

The first pressure gauge 423, which is disposed at the external air inlet of the stacks 20a and 20b, may sense the pressure of external air to be supplied to the stacks 20a and 20b. The second pressure gauge 424, which is disposed at the exhaust air outlet of the stacks 20a and 20b, may sense the pressure of exhaust air discharged from the stacks 20a and 20b. Upon receiving pressure values sensed by the first and second pressure gauges 423 and 424, the controller 440 may subtract the pressure value sensed by the second pressure gauge 424 from the pressure value sensed by the first pressure gauge 423 to measure (or determine) differential pressure Pn between the inlet and the outlet of the stacks 20a and 20b (S141).

The controller 440 may compare the measured differential pressure Pn with a set differential pressure Pt (S142). The set differential pressure Pt may be the pressure difference between the external air inlet and the exhaust air outlet of the stacks 20a and 20b by which an appropriate amount of external air necessary for power generation by the stacks 20a and 20b is introduced into the stacks 20a and 20b. The set differential pressure Pt may be a range having a lower limit value and an upper limit value. The set differential pressure Pt may be a value preset and stored in a memory of the controller 440 (or other memory).

When the measured differential pressure Pn is greater than the set differential pressure Pt, the controller 440 may perform control such that rotational frequency of the stack air blower 72 is reduced (S143a). As a result, the pressure at the inlet of the stacks 20a and 20b may be reduced, such that the differential pressure between the inlet and the outlet of the stacks 20a and 20b may be reduced.

When the measured differential pressure Pn is less than the set differential pressure Pt, the controller 440 may perform control such that rotational frequency of the stack air blower 72 is increased (S143b). As a result, the pressure at the inlet of the stacks 20a and 20b may be increased, such that the differential pressure between the inlet and the outlet of the stacks 20a and 20b may be increased.

The differential pressure between the air inlet and the air outlet of the stacks 20a and 20b may be maintained at the set differential pressure Pt such that an appropriate amount of external air may remain in the stacks 20a and 20b or may flow from the inlet to the outlet. This may maintain power generation performance of the stacks 20a and 20b.

When the measured differential pressure Pn is equal to the set differential pressure Pt, the controller 440 may finish the differential pressure control mode (S144). When the differential pressure control mode is finished (or completed), the controller 440 may measure (or determine) the current time Sn+1, and may subtract the measured time Sn therefrom to calculate the time Sn+1−Sn elapsed from the time at which the humidity maintenance mode is executed. The controller 440 may compare the elapsed time Sn+1−Sn with control cycle time C (S15).

The control cycle time C may be a cycle for which the first three-way valve 400 and the second three-way valve 410 are controlled based on a measured value of the humidity of external air to be supplied to the stacks 20a and 20b, which is a time preset in the memory of the controller 440 (or other memory).

When the control cycle time C is set to be large, the control cycle may be lengthened such that the humidity value of external air may be relatively stably adjusted. When the control cycle time C is set to be small, the control cycle may be shortened such that the humidity value of external air may be relatively minutely adjusted.

When the elapsed time Sn+1−Sn is less than the control cycle time C, the controller 440 maintains positions of the first three-way valve 400 and the second three-way valve 410 switched to the humidity maintenance mode without separate control.

When the elapsed time Sn+1−Sn is greater than the control cycle time C, the controller 440 may return to operation S10 again to measure the humidity of external air, and perform operations S11 to S15.

Figure 9:
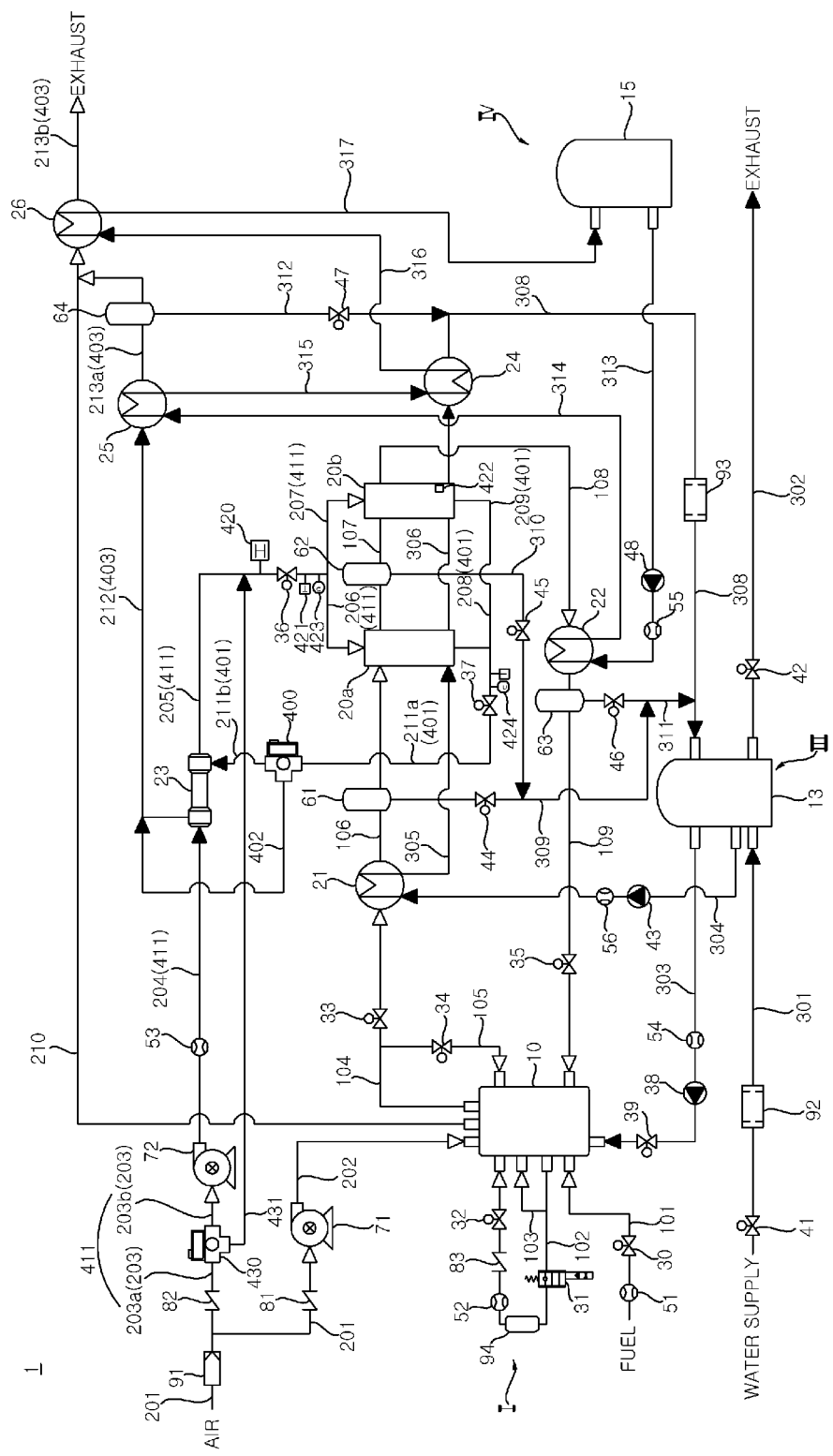
FIG. 9 is a view showing construction of a fuel cell apparatus according to a second embodiment of the present disclosure.

The fuel cell apparatus 1 according to a second embodiment of the present disclosure may be described with reference to FIGS. 9 and 10.

The fuel cell apparatus 1 according to the second embodiment may include a recirculation channel 431 branched from the second intake channel 205 and joined to the external air introduction channel 203 and a third three-way valve 430 disposed at the portion of the external air introduction channel 203 to which the recirculation channel 431 is joined.

The recirculation channel 431 may allow external air discharged from the humidifier 23 and flowing in the second intake channel 205 to be supplied to the stacks 20a and 20b via the third three-way valve 430, the stack air blower 72, and the humidifier 23.

The third three-way valve 430 may be disposed at the portion of the external air introduction channel 203 to which the recirculation channel 431 is joined so as to divide (or separate) the external air introduction channel 203 into a front end and a rear end.

The front end 203a of the external air introduction channel 203 may communicate with the main external air introduction channel 201 from the third three-way valve 430 such that external air flowing in the main external air introduction channel 201 is supplied to the third three-way valve 430. The rear end 203b of the external air introduction channel 203 may connect the third three-way valve 430 and the stack air blower 72 to each other such that external air discharged from the third three-way valve 430 is supplied to the stack air blower 72.

The third three-way valve 430 may close the front end 203a of the external air introduction channel 203 in proportion to opening of the recirculation channel 431. That is, the third three-way valve 430 may allow the opening amount of the recirculation channel 431 and the opening amount of the front end 203a of the external air introduction channel 203 to be inversely proportional to each other.

As one example, when the recirculation channel 431 is open 30%, the front end 203a (of the external air introduction channel) may be open 70%. At this time, about 30% of external air supplied to the third three-way valve 430 may be external air to be supplied through the recirculation channel 431, and the remainder of the external air (i.e., about 70% of the external air) may be external air introduced from the outside through the front end 203a (of the external air introduction channel).

As one example, when the recirculation channel 431 is closed, the front end 203a (of the external air introduction channel) may be open 100%. At this time, all external air supplied to the third three-way valve 430 may be external air introduced from the outside through the front end 203a (of the external air introduction channel).

The humidity sensor 420 may be disposed in the second intake channel 205. The humidity sensor 420 may sense the humidity (or humidity value) of external air that has passed through the stack air blower 72 and the humidifier 23 once. Alternatively, the humidity sensor 420 may sense the humidity of a mixture of external air that has passed through the stack air blower 72 and the humidifier 23 once and recirculated external air that has passed through the stack air blower 72 and the humidifier 23 twice or more.

The intake temperature sensor 421 may sense the temperature of external air to be supplied to the stacks 20a and 20b, and may transmit the sensed temperature to the controller 440. The stack temperature sensor 422 may sense the internal temperature of the stacks 20a and 20b, and may transmit the sensed internal temperature to the controller 440.

The controller 440 may control the third three-way valve 430 based on the temperature values sensed by the intake temperature sensor 421 and/or the stack temperature sensor 422 such that the opening amount of the recirculation channel 431 and the opening amount of the portion of the external air introduction channel 203 into which external air is introduced (i.e., the front end 203a of the external air introduction channel) are inversely proportional to each other.

Alternatively, the controller 440 may control the third three-way valve 430 based on the average of the temperature values sensed by the first temperature sensor 422a and the second temperature sensor 422b, rather than the stack temperature sensor 422.

As one example, when the sensed temperature values are low, the controller 440 may control the third three-way valve 430 such that the recirculation channel 431 is open 30% and the front end 203a (of the external air introduction channel) is open 70%, and therefore about 30% of external air to be supplied to the stacks 20a and 20b may be recirculated external air that has been passed through the stack air blower 72 at least twice.

When the temperature of external air to be supplied to the stacks 20a and 20b is lower than optimum temperature, a dew point formation phenomenon may easily occur in the stacks 20a and 20b due to low saturated water vapor pressure of the external air such that condensate may be generated. The generated condensate may cause a flooding phenomenon in the stacks 20a and 20b such that efficiency of power generation by the stacks 20a and 20b may be lowered.

When the temperature of external air is lower than the optimum temperature, the recirculation channel 431 may be open such that the external air passes through the stack air blower 72 again. When passing through the stack air blower 72, external air may be compressed such that the temperature of the external air may be raised, and therefore the saturated water vapor pressure of the external air may be increased.

When the recirculation channel 431 is open to an appropriate amount in order to increase the saturated water vapor pressure of external air supplied to the stacks 20a and 20b to an appropriate level, a flooding phenomenon may be prevented.

A method of controlling the fuel cell apparatus 1 according to the second embodiment may be described with reference to FIGS. 8 to 16. When driving of the fuel cell apparatus 1 is started (S20), a user may set a target power generation amount (S21). The user setting of the target power generation amount may be setting of a target amount of electrical energy generated by the stacks 20a and 20b through electrochemical reaction in a power generation mode. As the user's target power generation amount is set to be higher, a larger amount of external air may need to be supplied to the stacks 20a and 20b.

When the user's target power generation amount is set, the controller 440 may switch the valves to initial states thereof (S22).

The controller 440 may switch the first three-way valve 400 to the humidifier 23 to close the first bypass channel 402. The controller 440 may switch the third three-way valve 430 to the outside to close the recirculation channel 431. However, these are initial states arbitrarily set in the controller 440, and initial positions of the valve may be changed depending on setting.

Additionally, the controller 440 may close the stack in valve 36 and the stack out valve 37. This may prevent introduction of foreign matter into the stacks 20a and 20b.

A preheating operation mode may be executed (S23) in which the burner air blower 71 suctions external air and supplies the suctioned external air to the burner 120, fuel is supplied to the burner 120, and the burner 120 is operated to burn the fuel and the external air to preheat the reformer 140.

During execution of the preheating operation mode, the controller 440 may compare the internal temperature of the reformer with a set reformer temperature (S24).

The internal temperature of the reformer may be a value sensed by the temperature sensor disposed in the reformer. The set reformer temperature may be temperature (or temperature value) suitable for the reformer to generate reformed gas, which may be a value preset and stored in the controller 440.

When the internal temperature (or inner temperature) of the reformer reaches the set reformer temperature, a reforming operation mode may be executed (S25) in which fuel and steam are supplied to the reformer 140 and the reformer 140 reforms the fuel and the steam to generate reformed gas.

In the reforming operation mode, reformed gas generated by the reformer may be supplied to the burner so as to be used for combustion. For example, the controller 440 may close the reformed gas valve 33 and may open the bypass valve 34.

A description of the desulfurizer, the mixer, and the steam generator in connection with the fuel and the steam supplied to the reformer may be similar to the above description, and thus a further description may be omitted.

The controller 440 may compare the carbon monoxide (CO) concentration of reformed gas generated by the reformer with a set concentration (S26).

The (CO) concentration of reformed gas may be a value sensed by the concentration sensor in the reformer or in the outlet of the reformer. The set concentration may be CO concentration suitable for reformed gas to be supplied to the stacks 20a and 20b such that electrochemical reaction occurs, which may be a value preset and stored in the controller 440.

When the CO concentration of reformed gas is reduced to the set concentration, a power generation operation mode may be executed (S27) in which external air and reformed gas are supplied to the stacks 20a and 20b such that electrical energy is generated through electrochemical reaction.

The controller 440 may control the stack air blower 72 to supply external air to the stacks 20a and 20b. The controller 440 may open the stack in valve 36 and the stack out valve 37 such that external air is supplied to the stacks 20a and 20b and exhaust air is discharged from the stacks 20a and 20b.

The controller 440 may open the reformed gas valve 33 and may close the bypass valve 34 such that reformed gas generated by the reformer is supplied to the stacks 20a and 20b.

In the stacks 20a and 20b, electrochemical reaction may occur between oxygen contained in the supplied external air and hydrogen contained in the reformed gas, thus generating electrical energy and moisture. The generated moisture may be contained in exhaust air discharged from the stacks 20a and 20b.

The controller 440 may determine whether user setting on whether the fuel cell apparatus 1 will control the temperature and humidity of external air supplied to the stacks 20a and 20b is turned on (S28). When the user setting on whether to control the temperature and the humidity is turned on, entry into a temperature and humidity control mode corresponding to operations S29 to S37 may be performed.

When entry into the temperature and humidity control mode is performed, the controller 440 may receive the humidity Hn of external air supplied to the stacks 20a and 20b, sensed by the humidity sensor 420. Additionally, the controller 440 may receive the temperature Tn of external air supplied to the stacks 20a and 20b, sensed by the intake temperature sensor 421. Additionally, the controller 440 may receive the internal temperature Ts (or internal temperature value) of the stacks 20a and 20b, sensed by the stack temperature sensor 422 (S29).

The controller 440 may subtract a setting difference value D from the internal temperature Ts of the stacks 20a and 20b to set a target temperature Tf (S30) (or target temperature value).

The setting difference value D may be a value at which external air supplied to the stacks 20a and 20b reaches the temperature (and the saturated water vapor pressure) at which the external air is not easily condensed in the stacks 20a and 20b, which may be a value preset and stored in the controller 440. As one example, the setting difference value may be 10 degrees to 15 degrees based on the operating environment of the fuel cell apparatus 1.

The target temperature Tf may be a temperature having saturated water vapor pressure at which external air to be supplied to the stacks 20a and 20b is not easily condensed.

The controller 440 may compare the received measured temperature value Tn with the set target temperature Tf (S31). The controller 440 may determine whether the received measured humidity value Hn is equal to or greater than a lower limit humidity value Hl and is equal to or less than an upper limit humidity value Hh, is less than the lower limit humidity value Hl, or is greater than the upper limit humidity value Hh (S32).

A description of the lower limit humidity value Hl and the upper limit humidity value Hh may be similar to the above description of the first embodiment, and thus a further description may be omitted.

When the measured temperature value Tn is equal to or greater than the target temperature Tf and the measured humidity value Hn is less than the lower limit humidity value Hl, the controller 440 may switch the first three-way valve 400 and the third three-way valve 430 to a first mode, or may maintain positions of the first three-way valve 400 and the third three-way valve 430 switched to the first mode (S33a).

The first mode may be a mode in which the controller 440 controls the first three-way valve 400 and the third three-way valve 430 such that the humidity of external air supplied to the stacks 20a and 20b is raised to the optimum humidity range while the external air is not recirculated to the stack air blower 72.

Figure 10:
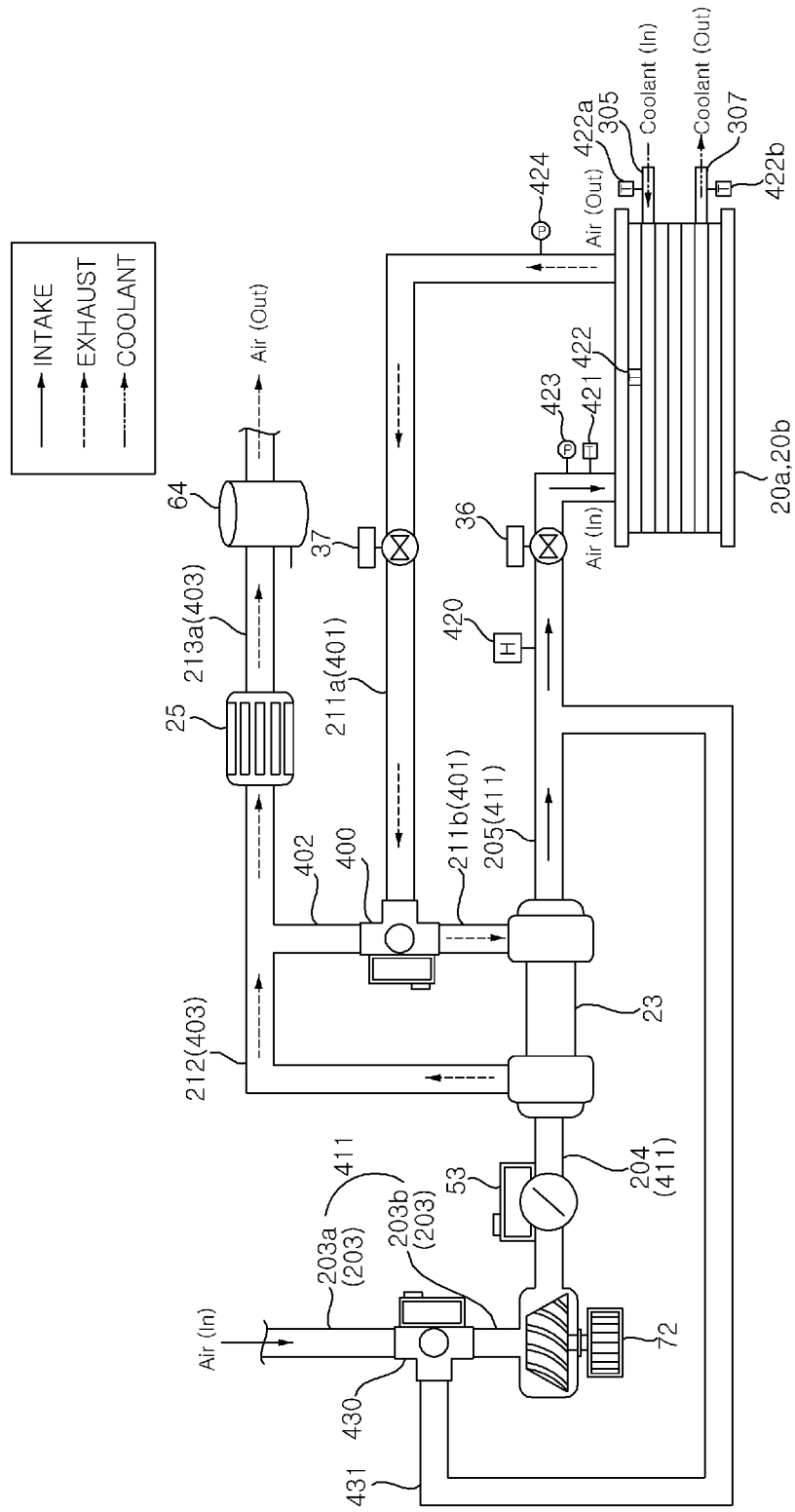
FIG. 10 is a view showing a flow in a first mode according to a second embodiment of the present disclosure.

As one example, when the temperature value of external air sensed by the intake temperature sensor 421 (i.e., the measured temperature value Tn) is equal to or greater than the target temperature value Tf set depending on the internal temperature value Ts of the stacks 20a and 20b sensed by the stack temperature sensor 422 and the humidity value of external air sensed by the humidity sensor 420 (i.e., the measured humidity value Hn) is less than the set lower limit humidity value Hl, the controller 440 may control the first three-way valve 400 such that the first bypass channel 402 is closed, and may control the third three-way valve 430 such that the recirculation channel 431 is closed (see FIG. 10).

When the first three-way valve 400 is switched to the humidifier 23 such that the first bypass channel 402 is closed and the second exhaust channel 211b is open 100%, all exhaust air discharged from the stacks 20a and 20b may be supplied to the humidifier 23 through the first exhaust channel 211a and the second exhaust channel 211b.

The humidifier 23 may extract moisture contained in exhaust air, and may supply the extracted moisture to external air. All exhaust air discharged from the stacks 20a and 20b may be supplied to the humidifier 23 such that moisture is extracted therefrom. Thus, the humidity of external air passing through the humidifier 23 may be further raised.

The external air humidified by the humidifier 23 may flow through the second intake channel 205. The exhaust air dehumidified by the humidifier 23 may be discharged to the outside through the discharge channel 403. When the third three-way valve 430 is switched to the outside, such that the front end 203a (of the external air introduction channel) is open 100% and the recirculation channel 431 is closed, external air flowing in the second intake channel 205 may be directly supplied to the stacks 20a and 20b without recirculation to the stack air blower 72.

In the first mode, the humidity of external air supplied to the stacks 20a and 20b may be raised to the optimum humidity range while preventing overheating of the external air.

When the measured temperature value Tn is equal to or greater than the target temperature value Tf and the measured humidity value Hn is equal to or greater than the lower limit humidity value Hl and is equal to or less than the upper limit humidity value Hh, the controller 440 may switch the first three-way valve 400 and the third three-way valve 430 to a second mode, or may maintain positions of the first three-way valve 400 and the third three-way valve 430 switched to the second mode (S33b).

The second mode may be a mode in which the controller 440 controls the first three-way valve 400 and the third three-way valve 430 such that the humidity of external air to be supplied to the stacks 20a and 20b is maintained within the optimum humidity range while the external air is not recirculated to the stack air blower 72.

Figure 11:
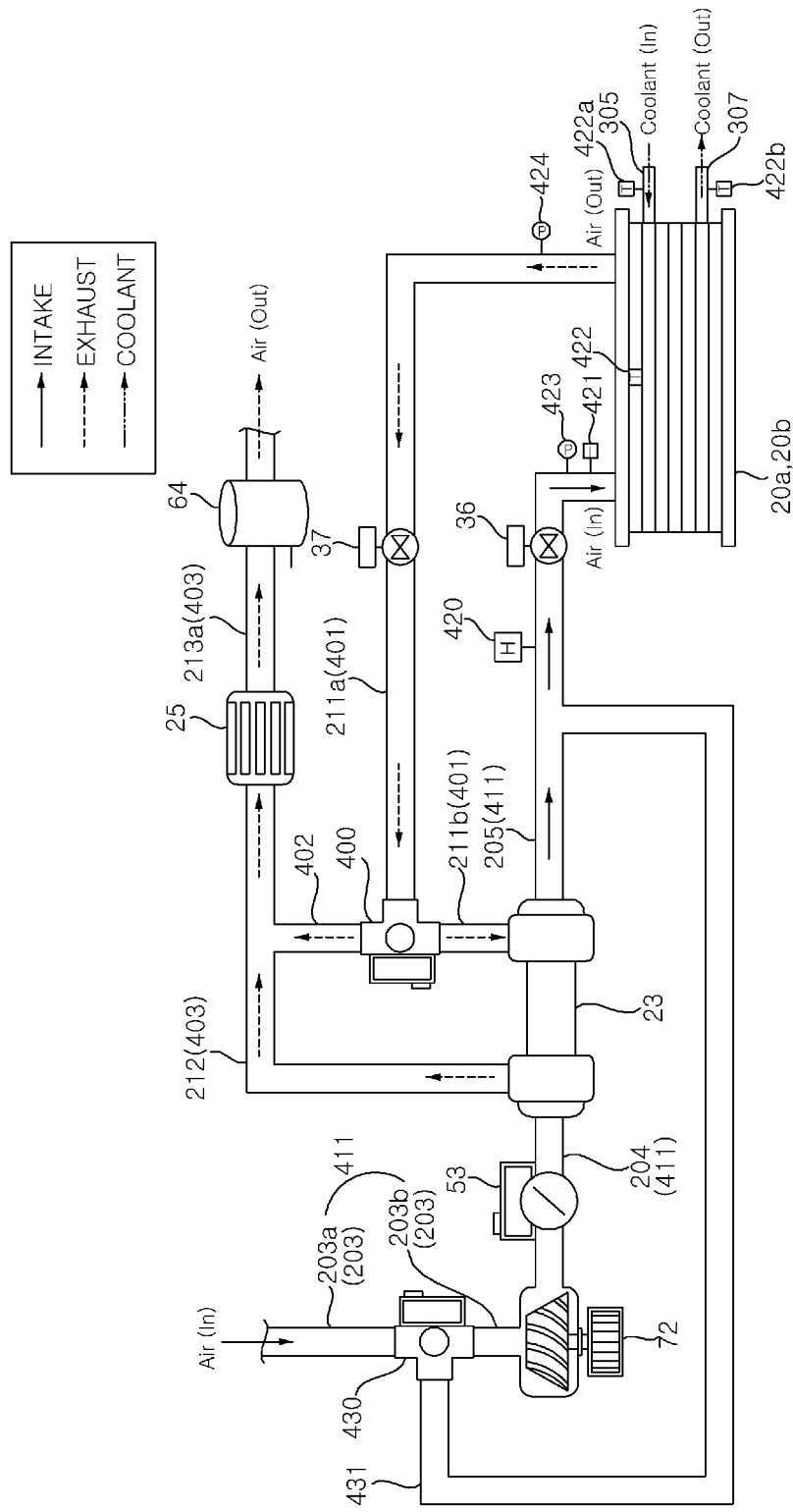
FIG. 11 is a view showing a flow in a second mode and a third mode according to a second embodiment of the present disclosure.

As one example, when the temperature value of external air sensed by the intake temperature sensor 421 (i.e., the measured temperature value Tn) is equal to or greater than the target temperature value Tf set depending on the internal temperature value Ts of the stacks 20a and 20b sensed by the stack temperature sensor 422 and the humidity value of external air sensed by the humidity sensor 420 (i.e., the measured humidity value Hn) is equal to or greater than the set lower limit humidity value Hl and is equal to or less than the set upper limit humidity value Hh, the controller 440 may control the first three-way valve 400 such that the first bypass channel 402 is open to a first opening amount determined so as to be proportional to the humidity value of external air, and may control the third three-way valve 430 such that the recirculation channel 431 is closed (see FIG. 11).

The first opening amount may be an opening amount proportional to the humidity value of external air in order to inhibit an increase in the humidity value of external air as the humidity value of external air approximates the upper limit humidity value Hh and to inhibit a decrease in the humidity value of external air as the humidity value of external air approximates the lower limit humidity value, which may be a value preset and stored in the controller 440, in the same manner as the first embodiment.

In the same manner as the first embodiment, the first opening amount may have the set second opening amount as an upper limit.

When the first bypass channel 402 is open to the first opening amount and the second exhaust channel 211b is closed at the same percentage as the first opening amount, exhaust air of the percentage corresponding to the first opening amount, in exhaust air to be supplied to the first three-way valve 400, may be discharged to the outside through the first bypass channel 402, and exhaust air of the remaining percentage may be supplied to the humidifier 23 through the second exhaust channel 211b.

The amount of exhaust air supplied to the humidifier 23 may be appropriately adjusted, such that the humidity of external air supplied to the stacks 20a and 20b may be maintained within the optimum humidity range. External air humidified by the humidifier 23 may flow in the second intake channel 205. Exhaust air dehumidified by the humidifier 23 may be discharged to the outside through the discharge channel 403.

When the third three-way valve 430 is switched to the outside, such that the front end 203a of the external air introduction channel is open 100% and the recirculation channel 431 is closed, external air flowing in the second intake channel 205 may be directly supplied to the stacks 20a and 20b without recirculation to the stack air blower 72.

In the second mode, the humidity of external air to be supplied to the stacks 20a and 20b may be maintained within the optimum humidity range while preventing overheating of the external air.

When the measured temperature value Tn is equal to or greater than the target temperature Tf and the measured humidity value Hn is greater than the upper limit humidity value Hh, the controller 440 may switch the first three-way valve 400 and the third three-way valve 430 to a third mode, or may maintain positions of the first three-way valve 400 and the third three-way valve 430 switched to the third mode (S33c).

The third mode may be a mode in which the controller 440 controls the first three-way valve 400 and the third three-way valve 430 such that the humidity of external air supplied to the stacks 20a and 20b is reduced to the optimum humidity range while the external air is not recirculated to the stack air blower 72.

As one example, when the temperature value of external air sensed by the intake temperature sensor 421 (i.e., the measured temperature value Tn) is equal to or greater than the target temperature value Tf set depending on the internal temperature value Ts of the stacks 20a and 20b sensed by the stack temperature sensor 422 and the humidity value of external air sensed by the humidity sensor 420 (i.e., the measured humidity value Hn) is greater than the set upper limit humidity value Hh, the controller 440 may control the first three-way valve 400 such that the first bypass channel 402 is open to the set second opening amount, and may control the third three-way valve 430 such that the recirculation channel 431 is closed (see FIG. 11).

In the same manner as the first embodiment, the second opening amount may be an upper limit opening amount to which the first bypass channel 402 can be open, which may be a value preset and stored in the controller 440. For example, the second opening amount may be 80%. The second opening amount may be set to 80% such that the second exhaust channel 211b is open 20% in the dehumidification mode.

When the first bypass channel 402 is open to the second opening amount and the second exhaust channel 211b is closed at the same percentage as the second opening amount, exhaust air of the percentage corresponding to the second opening amount, in exhaust air supplied to the first three-way valve 400, may be discharged to the outside through the first bypass channel 402, and exhaust air of the remaining percentage may be supplied to the humidifier 23 through the second exhaust channel 211b.

The amount of exhaust air supplied to the humidifier 23 may be reduced such that the humidity of external air passing through the humidifier 23 may be reduced to the optimum humidity range. The external air that has passed through the humidifier 23 may flow in the second intake channel 205. The exhaust air dehumidified by the humidifier 23 may be discharged to the outside through the discharge channel 403.

When the third three-way valve 430 is switched to the outside, such that the front end 203a (of the external air introduction channel) is open 100% and the recirculation channel 431 is closed, external air flowing in the second intake channel 205 may be directly supplied to the stacks 20a and 20b without recirculation to the stack air blower 72.

In the third mode, the humidity of external air supplied to the stacks 20a and 20b may be reduced to the optimum humidity range while preventing overheating of the external air.

When the measured temperature value Tn is less than the target temperature value Tf and the measured humidity value Hn is less than the lower limit humidity value Hl, the controller 440 may switch the first three-way valve 400 and the third three-way valve 430 to a fourth mode, or may maintain positions of the first three-way valve 400 and the third three-way valve 430 switched to the fourth mode (S33d).

The fourth mode may be a mode in which the controller 440 controls the first three-way valve 400 and the third three-way valve 430 such that the humidity of external air to be supplied to the stacks 20a and 20b is raised to the optimum humidity range while the external air is recirculated to the stack air blower 72.

Figure 12:
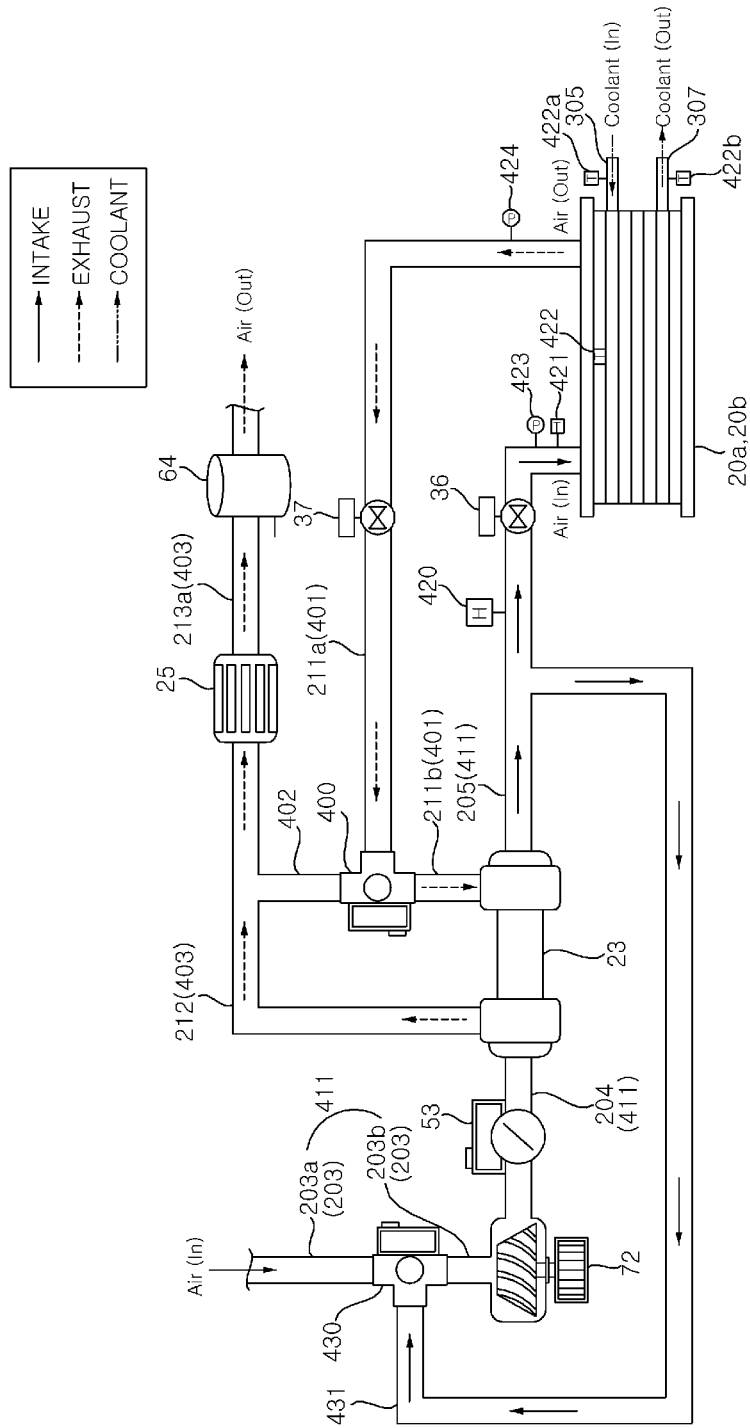
FIG. 12 is a view showing a flow in a fourth mode according to a second embodiment of the present disclosure.

When the temperature value of external air sensed by the intake temperature sensor 421 (i.e., the measured temperature value Tn) is less than the target temperature value Tf set depending on the internal temperature value Ts of the stacks 20a and 20b sensed by the stack temperature sensor 422 and the humidity value of external air sensed by the humidity sensor 420 (i.e., the measured humidity value Hn) is less than the set lower limit humidity value Hl, the controller 440 may control the first three-way valve 400 such that the first bypass channel 402 is closed, and may control the third three-way valve 430 such that the recirculation channel 431 is open to a set fourth opening amount (see FIG. 12).

When the first three-way valve 400 is switched to (or maintained at) the humidifier 23, such that the first bypass channel 402 is closed and the second exhaust channel 211b is open 100%, all exhaust air discharged from the stacks 20a and 20b may be supplied to the humidifier 23 through the first exhaust channel 211a and the second exhaust channel 211b.

The humidifier 23 may extract moisture contained in exhaust air, and may supply the extracted moisture to external air. All exhaust air discharged from the stacks 20a and 20b may be supplied to the humidifier 23 such that moisture is extracted therefrom. This may further raise the humidity of external air passing through the humidifier 23.

The external air humidified by the humidifier 23 may flow in the second intake channel 205. The exhaust air dehumidified by the humidifier 23 may be discharged to the outside through the discharge channel 403.

The fourth opening amount may be an opening amount of the recirculation channel 431 that allows an optimum percentage of external air to pass through the stack air blower 72 again to raise the temperature and the saturated water vapor pressure of external air supplied to the stacks 20a and 20b. This may prevent a flooding phenomenon. The fourth opening amount may be a value preset and stored in the controller 440.

The fourth opening amount may be an opening amount of the recirculation channel 431 that allows external air of an optimum percentage, in external air flowing in the second intake channel 205, to pass through the stack air blower 72 again to raise the temperature and the saturated water vapor pressure of external air supplied to the stacks 20a and 20b. This may prevent a flooding phenomenon. The fourth opening amount may be a value preset and stored in the controller 440.

The fourth opening amount may be set in consideration of the fact that recirculated external air may be over-humidified while passing through the humidifier 23. Additionally, the fourth opening amount may be set in consideration of the fact that the front end 203a of the external air introduction channel 203 is closed in proportion to opening of the recirculation channel 431, such that the introduction amount of external air is reduced. As one example, the fourth opening amount may be 30%.

When the recirculation channel 431 is open to the fourth opening amount and the front end 203a (of the external air introduction channel) is closed in proportion to the fourth opening amount, external air of the percentage corresponding to the fourth opening amount, in external air suctioned to the stack air blower 72, may be recirculated external air supplied through the recirculation channel 431 and suctioned to the stack air blower 72, and external air of the remaining percentage may be external air supplied from the front end 203a (of the external air introduction channel).

External air of the percentage corresponding to approximately the fourth opening amount, in external air supplied to the stacks 20a and 20b, may be recirculated external air. Accordingly, the temperature and the saturated water vapor pressure of external air supplied to the stacks 20a and 20b may be raised. This may prevent a flooding phenomenon in the stacks 20a and 20b.

In the fourth mode, the temperature of external air supplied to the stacks 20a and 20b may be raised to the target temperature, such that the saturated water vapor pressure of the external air may be raised. Thus, a flooding phenomenon may be prevented, and the humidity of external air may be raised to the optimum humidity range.

When the measured temperature value Tn is less than the target temperature value Tf and the measured humidity value Hn is equal to or greater than the lower limit humidity value Hl and is equal to or less than the upper limit humidity value Hh, the controller 440 may switch the first three-way valve 400 and the third three-way valve 430 to a fifth mode, or may maintain positions of the first three-way valve 400 and the third three-way valve 430 switched to the fifth mode (S33e).

The fifth mode may be a mode in which the controller 440 controls the first three-way valve 400 and the third three-way valve 430 such that the humidity of external air supplied to the stacks 20a and 20b is maintained within the optimum humidity range while the external air is recirculated to the stack air blower 72.

Figure 13:
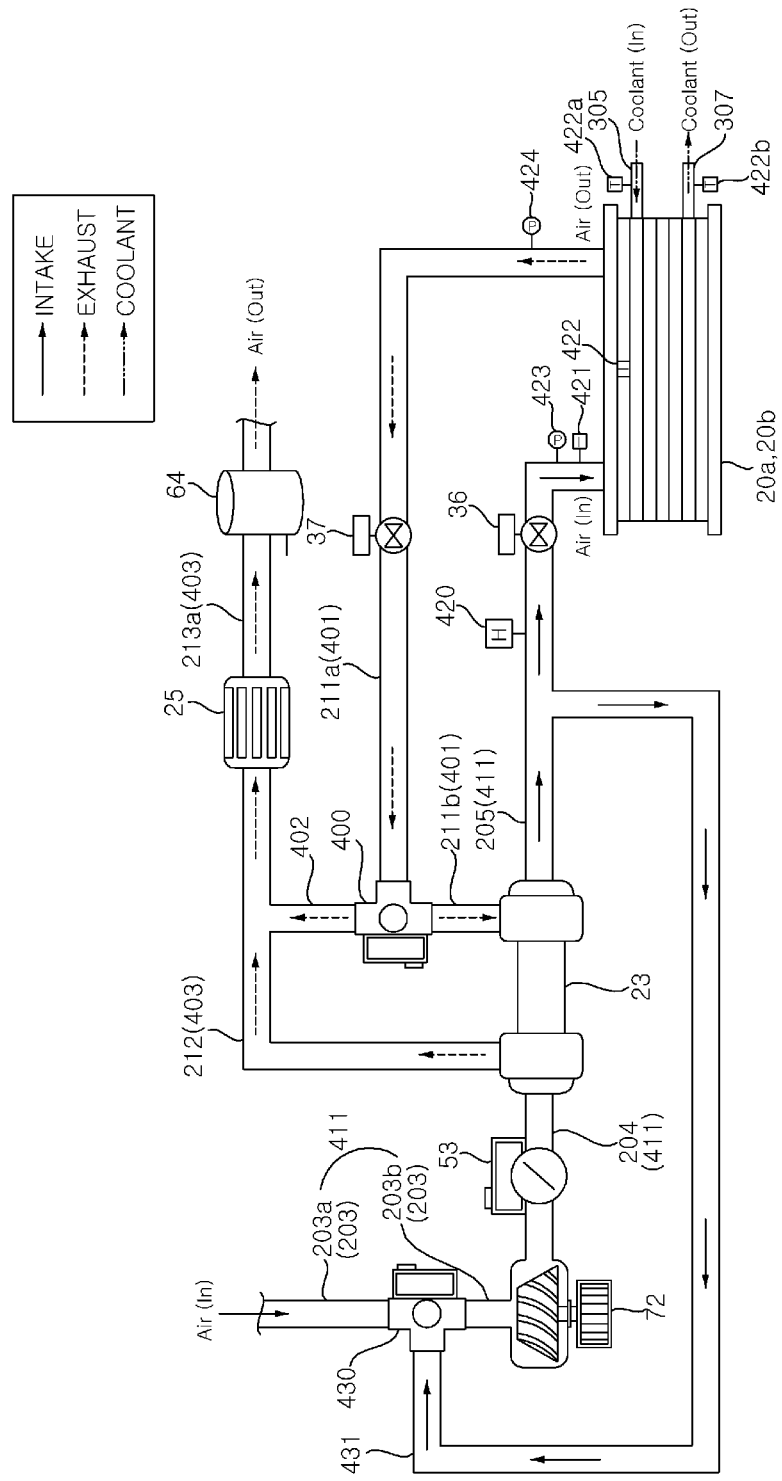
FIG. 13 is a view showing a flow in a fifth mode and a sixth mode according to a second embodiment of the present disclosure.
Figure 14:
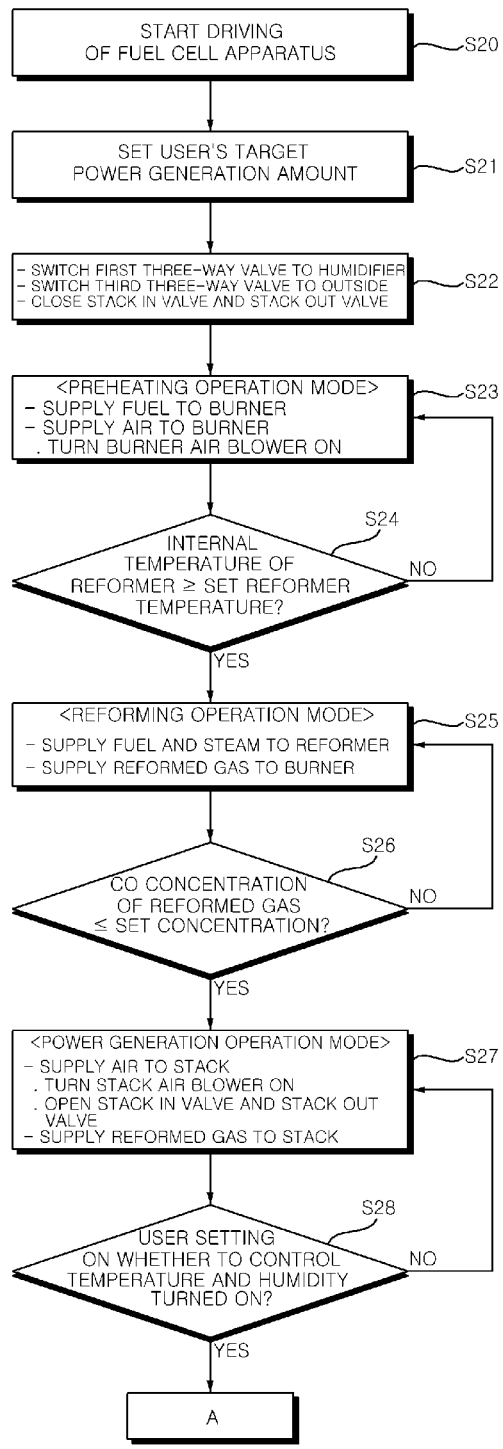
FIGS. 14 and 15 are control flowcharts according to a second embodiment of the present disclosure.
Figure 15:
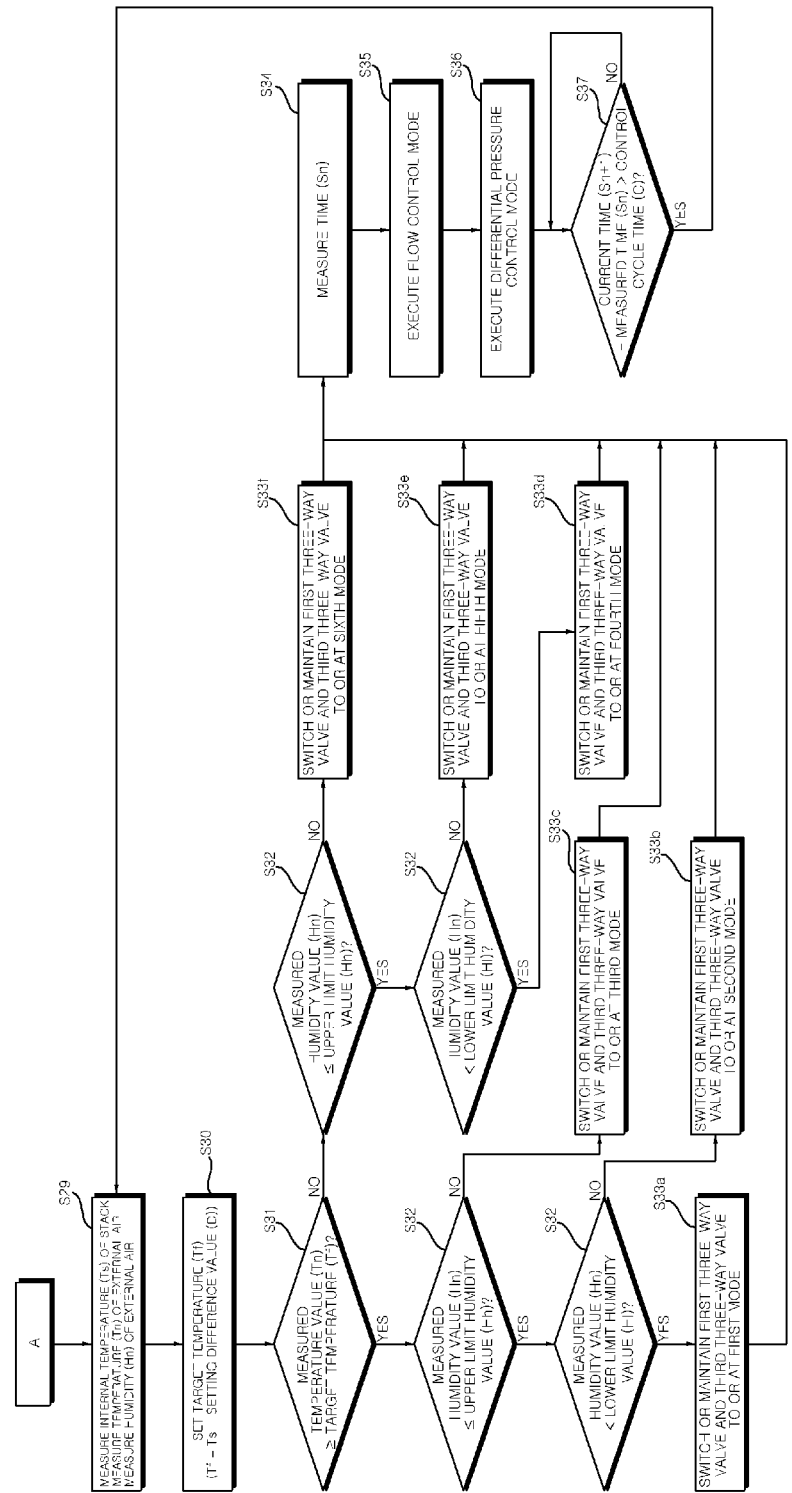

As one example, when the temperature value of external air sensed by the intake temperature sensor 421 (i.e., the measured temperature value Tn) is less than the target temperature value Tf set depending on the internal temperature value Ts of the stacks 20a and 20b sensed by the stack temperature sensor 422 and the humidity value of external air sensed by the humidity sensor 420 (i.e., the measured humidity value Hn) is equal to or greater than the set lower limit humidity value Hl and is equal to or less than the set upper limit humidity value Hh, the controller 440 may control the first three-way valve 400 such that the first bypass channel 402 is open to the first opening amount determined so as to be proportional to the humidity value of external air, and may control the third three-way valve 430 such that the recirculation channel 431 is open to the set fourth opening amount (see FIG. 13).

When the first bypass channel 402 is open to the first opening amount and the second exhaust channel 211b is closed at the same percentage as the first opening amount, exhaust air of the percentage corresponding to the first opening amount, in exhaust air supplied to the first three-way valve 400, may be discharged to the outside through the first bypass channel 402, and exhaust air of the remaining percentage may be supplied to the humidifier 23 through the second exhaust channel 211b.

In the same manner as the first embodiment, the first opening amount may have the set second opening amount as an upper limit.

The amount of exhaust air supplied to the humidifier 23 may be appropriately adjusted, such that the humidity of external air supplied to the stacks 20a and 20b may be maintained within the optimum humidity range. External air humidified by the humidifier 23 may flow in the second intake channel 205. Exhaust air dehumidified by the humidifier 23 may be discharged to the outside through the discharge channel 403.

When the recirculation channel 431 is open to the fourth opening amount and the front end 203a (of the external air introduction channel) is closed in proportion to the fourth opening amount, external air of the percentage corresponding to the fourth opening amount, in external air suctioned to the stack air blower 72, may be recirculated external air supplied through the recirculation channel 431 and suctioned to the stack air blower 72, and external air of the remaining percentage may be external air supplied from the front end 203a of the external air introduction channel.

External air of the percentage corresponding to approximately the fourth opening amount, in external air supplied to the stacks 20a and 20b, may be recirculated external air. Accordingly, the temperature and the saturated water vapor pressure of external air supplied to the stacks 20a and 20b may be raised. This may prevent a flooding phenomenon in the stacks 20a and 20b.

In the fifth mode, the temperature of external air supplied to the stacks 20a and 20b may be raised to the target temperature, such that the saturated water vapor pressure of the external air may be raised. Thus, a flooding phenomenon may be prevented, and the humidity of external air supplied to the stacks 20a and 20b may be maintained within the optimum humidity range.

When the measured temperature value Tn is less than the target temperature value Tf and the measured humidity value Hn is greater than the upper limit humidity value Hh, the controller 440 may switch the first three-way valve 400 and the third three-way valve 430 to a sixth mode, or may maintain positions of the first three-way valve 400 and the third three-way valve 430 switched to the sixth mode (S33f).

The sixth mode may be a mode in which the controller 440 controls the first three-way valve 400 and the third three-way valve 430 such that the humidity of external air supplied to the stacks 20a and 20b is reduced to the optimum humidity range while the external air is recirculated to the stack air blower 72.

As one example, when the temperature value of external air sensed by the intake temperature sensor 421 (i.e., the measured temperature value Tn) is less than the target temperature value Tf set depending on the internal temperature value Ts of the stacks 20a and 20b sensed by the stack temperature sensor 422 and the humidity value of external air sensed by the humidity sensor 420 (i.e., the measured humidity value Hn) is greater than the set upper limit humidity value Hh, the controller 440 may control the first three-way valve 400 such that the first bypass channel 402 is open to the set second opening amount, and may control the third three-way valve 430 such that the recirculation channel 431 is open to the set fourth opening amount (see FIG. 13).

When the first bypass channel 402 is open to the second opening amount and the second exhaust channel 211b is closed at the same percentage as the second opening amount, exhaust air of the percentage corresponding to the second opening amount, in exhaust air supplied to the first three-way valve 400, may be discharged to the outside through the first bypass channel 402, and exhaust air of the remaining percentage may be supplied to the humidifier 23 through the second exhaust channel 211b.

The amount of exhaust air supplied to the humidifier 23 may be reduced, such that the humidity of external air passing through the humidifier 23 may be reduced to the optimum humidity range. The external air that has passed through the humidifier 23 may flow in the second intake channel 205. The exhaust air dehumidified by the humidifier 23 may be discharged to the outside through the discharge channel 403.

When the recirculation channel 431 is open to the fourth opening amount and the front end 203a of the external air introduction channel is closed in proportion to the fourth opening amount, external air of the percentage corresponding to the fourth opening amount, in external air suctioned to the stack air blower 72, may be recirculated external air supplied through the recirculation channel 431 and suctioned to the stack air blower 72, and external air of the remaining percentage may be external air supplied from the front end 203a of the external air introduction channel.

External air of the percentage corresponding to approximately the fourth opening amount, in external air supplied to the stacks 20a and 20b, may be recirculated external air. Accordingly, the temperature and the saturated water vapor pressure of external air to be supplied to the stacks 20a and 20b may be raised. This may prevent a flooding phenomenon in the stacks 20a and 20b.

In the sixth mode, the temperature of external air supplied to the stacks 20a and 20b may be raised to the target temperature, such that the saturated water vapor pressure of the external air may be raised. This may prevent a flooding phenomenon, and reduce the humidity of external air to the optimum humidity range.

In any one of operations S33a to S33f, the controller 440 may control the first three-way valve 400 and the third three-way valve 430, and may measure time Sn (S34).

Figure 16:
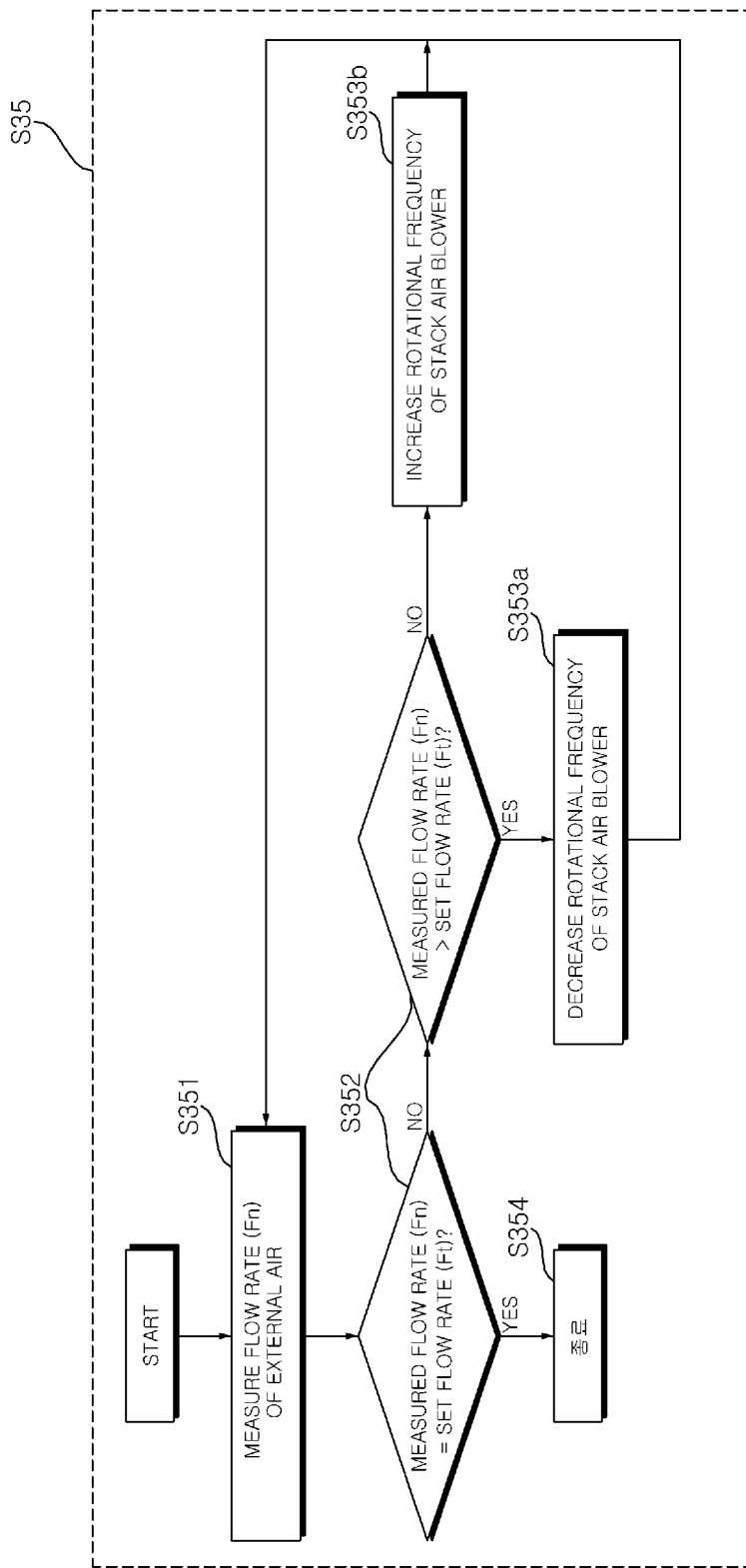
FIG. 16 is a control flowchart in a flow control mode according to an embodiment of the present disclosure.

The controller 440 may perform control such that rotational frequency of the stack air blower 72 is increased when the flow rate value sensed by the flow meter 53 is less than a set flow rate value and such that rotational frequency of the stack air blower 72 is decreased when the flow rate value sensed by the flow meter 53 is greater than the set flow rate value (S35) (see FIG. 16). As described above, the flow meter 53 may sense the flow rate of external air discharged from the stack air blower 72. The flow meter 53 may transmit the sensed flow rate Fn of the external air to the controller 440 (S351).

The controller 440 may compare the measured flow rate Fn with a set flow rate Ft (S352). The set flow rate Ft may be the flow rate of external air required to be supplied to the stacks 20a and 20b depending on the user's target power generation amount, which may be a value preset and stored in the memory of the controller 440 (or other memory). The set flow rate Ft may be a range value having a lower limit value and an upper limit value.

When the measured flow rate Fn is equal to the set flow rate Ft, the controller 440 may finish a flow control mode (S354).

When the measured flow rate Fn is greater than the set flow rate Ft, the controller 440 may decrease rotational frequency of the stack air blower 72 (S353a). The flow rate of external air supplied from the stack air blower 72 to the stacks 20a and 20b may be decreased, whereby an optimum flow rate of external air may be supplied to the stacks 20a and 20b.

When the measured flow rate Fn is less than the set flow rate Ft, the controller 440 may increase rotational frequency of the stack air blower 72 (S353b). The flow rate of external air supplied from the stack air blower 72 to the stacks 20a and 20b may be increased, such that an optimum flow rate of external air may be supplied to the stacks 20a and 20b.

Even when the opening position of the third three-way valve 430 is changed, an optimum flow rate of external air may be supplied to the stacks 20a and 20b, and power generation performance of the stacks 20a and 20b may be maintained.

When the flow control mode is finished, the controller 440 may execute a differential pressure control mode (S36) (see FIG. 8).

A description of the differential pressure control mode may be similar to the above description of the first embodiment, and thus a further description may be omitted.

When the differential pressure control mode is finished, the controller 440 may measure the current time Sn+1, and may subtract the measured time Sn therefrom to calculate the time elapsed after any one of the first to sixth modes is executed. The controller 440 may compare the elapsed time Sn+1−Sn with control cycle time C (S37).

When the elapsed time Sn+1−Sn is less than the control cycle time C, the controller 440 may maintain positions of the first three-way valve 400 and the third three-way valve 430 switched to any one of the first to sixth modes without separate control.

When the elapsed time Sn+1−Sn is greater than the control cycle time C, the controller 440 may perform operations S29 to S36 while measuring the temperature and humidity of external air again.

The control cycle time C may be a cycle in which the first three-way valve 400 and the third three-way valve 430 are controlled based on measured values of the temperature and humidity of external air to be supplied to the stacks 20a and 20b, which is a time preset in the memory of the controller 440 (or other memory).

When the control cycle time C is set to be large, the control cycle may be lengthened, such that the temperature and humidity values of external air may be relatively stably adjusted. When the control cycle time C is set to be small, the control cycle may be shortened, such that the temperature and humidity values of external air may be relatively minutely adjusted.

As is apparent from the above description, in a fuel cell apparatus according to an embodiment of the present disclosure, a first three-way valve and a second three-way valve are controlled depending on a sensed humidity value to adjust the humidification amount of external air in a humidifier. This may prevent a flooding phenomenon in a stack due to supply of over-humidified external air, prevent lowering in power generation performance of the stack due to supply of dry external air, and stably maintain the humidity of external air within an optimum humidity range.

In the fuel cell apparatus according to the embodiment of the present disclosure, rotational frequency of a stack air blower may be adjusted to adjust the pressure of an air inlet of the stack in spite of a change of an air channel due to switching of first, second, and/or third three-way valves during control of the temperature and humidity of external air. This may maintain a differential pressure between the air inlet and an air outlet of the stack at an appropriate value, and therefore the amount of external air that flows in the stack may be managed so as to be suitable for power generation, thereby maintaining power generation performance of the stack.

In the fuel cell apparatus according to the embodiment of the present disclosure, when the temperature of external air to be supplied to the stack is low, there is a possibility of a flooding phenomenon occurring in the stack. Accordingly, the third three-way valve may be controlled to recirculate external air supplied to the stack so as to flow to the stack air blower such that the temperature of the external air is raised. This may prevent a flooding phenomenon in the stack.

In the fuel cell apparatus according to the embodiment of the present disclosure, rotational frequency of the stack air blower may be increased even though a channel through which external air is suctioned from the outside is narrowed due to switching of the third three-way valve during control of the temperature of external air. This may maintain the amount of external air introduced from the outside, and therefore power generation performance of the stack may be maintained.

An object of the present disclosure may be to provide a fuel cell apparatus capable of decreasing the humidity of external air supplied to a stack when the external air supplied to the stack is over-humidified, whereby there is a possibility of a flooding phenomenon occurring in the stack.

An object of the present disclosure may be to provide a fuel cell apparatus capable of increasing the humidity of external air supplied to a stack when the external air supplied to the stack is dry, whereby there is a possibility of power generation performance of the stack being lowered.

An object of the present disclosure may be to provide a fuel cell apparatus capable of enabling external air to be supplied to a stack when having optimum humidity, even though conditions that may affect the humidity of the external air are changed when the humidity of the external air to be supplied to the stack has a humidity value suitable for power generation by the stack.

An object of the present disclosure may be to provide a fuel cell apparatus capable of increasing the temperature of external air to be supplied to a stack when the temperature of the external air to be supplied to the stack is low, whereby there is a possibility of a flooding phenomenon occurring in the stack.

An object of the present disclosure may be to provide a fuel cell apparatus capable of maintaining uniformity of the differential pressure between an external air inlet and an external air outlet of a stack even though a channel in which external air flows is changed in order to control the temperature and the humidity of the external air to be supplied to the stack. This may maintain power generation performance of the stack.

An object of the present disclosure may be to provide a fuel cell apparatus capable of maintaining the total amount of external air to be supplied to a stack even though a channel, through which the external air is suctioned from the outside, is narrowed in order to control the temperature of the external air supplied to the stack.

In order to accomplish the above objects, a fuel cell apparatus according to an embodiment of the present disclosure may include a stack, a stack air blower configured to supply external air to the stack, a humidifier configured to extract moisture contained in exhaust air discharged from the stack and to supply the extracted moisture to external air supplied to the stack, a first bypass channel configured to allow exhaust air to bypass the humidifier and to be discharged to the outside, a first three-way valve controlled to adjust the amount of exhaust air supplied to the humidifier, and a humidity sensor configured to sense the humidity of the external air supplied to the stack.

The fuel cell apparatus according to the embodiment of the present disclosure may further include a second bypass channel configured to allow external air to bypass the humidifier and to be supplied to the stack, a second three-way valve controlled to adjust the amount of external air that bypasses the humidifier, and a controller configured to control the first three-way valve and the second three-way valve such that the amount of external air and the amount of exhaust air supplied to the humidifier are adjusted depending on the sensed humidity value of the external air.

The first three-way valve and the second three-way valve may be controlled based on the sensed humidity value in order to adjust the humidity of the external air supplied to the stack, whereby it is possible to prevent a flooding phenomenon in the stack due to supply of over-humidified external air, to prevent lowering in power generation performance of the stack due to supply of dry external air, and to stably maintain the humidity of external air within an optimum humidity range.

The fuel cell apparatus according to the embodiment of the present disclosure may further include a first pressure gauge configured to sense the pressure of an external air inlet of the stack and a second pressure gauge configured to sense the pressure of an exhaust air inlet of the stack, wherein the controller may increase or decrease rotational frequency of the stack air blower to compensate for a differential pressure when the difference between the sensed pressures is greater or less than an optimum differential pressure.

In spite of switching of first, second, and/or third three-way valves and a change of an air channel, it is possible to maintain a differential pressure between the air inlet and an air outlet of the stack at an appropriate value, whereby it is possible to manage the amount of external air that flows in the stack so as to be suitable for power generation, thereby maintaining power generation performance of the stack.

A fuel cell apparatus according to an embodiment of the present disclosure may include a recirculation channel configured to recirculate external air that has passed through the stack air blower to the stack air blower again, a third three-way valve controlled to adjust the amount of external air introduced into the recirculation channel, an intake temperature sensor configured to sense the temperature of external air supplied to the stack, and a stack temperature sensor configured to sense the internal temperature of the stack, wherein the controller may control the third three-way valve such that the amount of external air recirculated to the stack air blower is adjusted depending on the sensed temperature value.

The third three-way valve may be controlled to recirculate external air supplied to the stack so as to flow to the stack air blower such that the temperature of the external air is raised, whereby it is possible to prevent a flooding phenomenon in the stack.

A fuel cell apparatus according to an embodiment of the present disclosure may include a flow meter configured to sense the flow rate of external air discharged from the stack air blower, wherein the controller may perform control such that the rotational frequency of the stack air blower is increased when the sensed flow rate value is less than an optimum flow rate value.

The amount of external air introduced from the outside may be maintained even though the recirculation channel is open due to switching of the third three-way valve, whereby it is possible to maintain power generation performance of the stack.

The effects of the present disclosure are not limited to those mentioned above, and other unmentioned effects will be clearly understood by a person having ordinary skill in the art to which the present disclosure pertains from the above description.

The accompanying drawings are provided only for a better understanding of the embodiments disclosed in the present specification and are not intended to limit the technical ideas disclosed in the present specification. Therefore, it should be understood that the accompanying drawings include all modifications, equivalents, and substitutions included in the idea and technical scope of the present disclosure.

Similarly, although operations are shown in a specific sequence in the drawings, this does not mean that the operations must be performed in the specific sequence or sequentially in order to obtain desired results or that all of the operations must be performed. In a specific case, multitasking and parallel processing may be advantageous.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fuel cell apparatus comprising:
a stack configured to provide electrical energy based on electrochemical reaction that includes oxygen and hydrogen;

a reformer configured to provide reformed gas to the stack;
a stack air blower configured to provide external air;
an intake channel configured to provide the external air from the stack air blower to the stack;
a humidifier configured to extract moisture contained in exhaust air from the stack and to provide the extracted moisture to the external air in the intake channel;
an exhaust channel to connect the stack to the humidifier, and
configured to receive the exhaust air from the stack and to provide the exhaust air to the humidifier;
a discharge channel configured to receive the exhaust air from the humidifier and to provide the received exhaust air to an outside of the fuel cell apparatus;
a first bypass channel to branch from the exhaust channel and to join the discharge channel;
a first three-way valve disposed at the exhaust channel between the stack and the humidifier, and configured to adjust an opening amount of the exhaust channel at the first three-way value and to adjust an opening amount of the first bypass channel at the first three-way valve;
a humidity sensor configured to sense a humidity value of the external air to be provided to the stack; and
a controller configured to control the first three-way valve such that the opening amount of the exhaust channel and the opening amount of the first bypass channel are inversely proportional to each other based on the humidity value of the external air sensed by the humidity sensor.

2. The fuel cell apparatus of claim 1, comprising:
an external air introduction channel configured to provide the external air to the stack air blower, wherein
the intake channel comprises:
a first intake channel to connect the stack air blower to the humidifier; and
a second intake channel to connect the humidifier to the stack.

3. The fuel cell apparatus of claim 2, comprising:
a second bypass channel to branch from the first intake channel and to join the second intake channel; and
a second three-way valve disposed at a portion of the first intake channel in which the second bypass channel is branched from the first intake channel, and is configured to adjust an opening amount of the first intake channel at the second three-way value and to adjust an opening amount of the second bypass channel at the second three-way valve, wherein
the humidity sensor is disposed downstream of a portion of the second intake channel in which the second bypass channel is joined to the second intake channel, and
the controller is configured to control the second three-way valve such that the opening amount of the first intake channel and the opening amount of the second bypass channel are inversely proportional to each other based on the humidity value of the external air sensed by the humidity sensor.

4. The fuel cell apparatus of claim 3, wherein
when the humidity value of the external air sensed by the humidity sensor is determined to be less than a set lower limit humidity value, the controller is to control the first three-way valve such that the first bypass channel is closed, and is to control the second three-way valve such that the second bypass channel is closed.

5. The fuel cell apparatus of claim 3, wherein
when the humidity value of the external air sensed by the humidity sensor is determined to be equal to or greater than a set lower limit humidity value and is determined to be equal to or less than a set upper limit humidity value, the controller is to control the first three-way valve such that the first bypass channel is open by a first opening amount that is proportional to the humidity value of the external air, and is to control the second three-way valve such that the second bypass channel is closed.

6. The fuel cell apparatus of claim 3, wherein
when the humidity value of the external air sensed by the humidity sensor is greater than a set upper limit humidity value, the controller is to control the first three-way valve such that the first bypass channel is open by a set second opening amount, and is to control the second three-way valve such that the second bypass channel is open by a third opening amount that is proportional to the humidity value of the external air.

7. The fuel cell apparatus of claim 2, comprising:
a recirculation channel to branch from the second intake channel and to join the external air introduction channel;
a third three-way valve disposed at a portion of the external air introduction channel in which the recirculation channel is joined to the external air introduction channel, and is configured to adjust an opening amount of the recirculation channel at the third three-way value and to adjust an opening amount of the external air introduction channel at the third three-way valve;
an intake temperature sensor disposed at the second intake channel, the intake temperature sensor being configured to sense a temperature value of the external air to be provided to the stack; and
a stack temperature sensor configured to sense an internal temperature value of the stack, wherein
the humidity sensor is disposed at the second intake channel, and
the controller is configured to control the third three-way valve such that the opening amount of the recirculation channel and the opening amount of the external air introduction channel are to be inversely proportional to each other based on the temperature value sensed by the intake temperature sensor and the internal temperature value sensed by the stack temperature sensor.

8. The fuel cell apparatus of claim 7, wherein
when the temperature value of the external air sensed by the intake temperature sensor is determined to be equal to or greater than a target temperature value that is set based on the internal temperature value of the stack sensed by the stack temperature sensor and the humidity value of the external air sensed by the humidity sensor is determined to be less than a set lower limit humidity value, the controller is to control the first three-way valve such that the first bypass channel is closed, and is to control the third three-way valve such that the recirculation channel is closed.

9. The fuel cell apparatus of claim 7, wherein
when the temperature value of the external air sensed by the intake temperature sensor is determined to be equal to or greater than a target temperature value that is set based on the internal temperature value of the stack sensed by the stack temperature sensor and the humidity value of the external air sensed by the humidity sensor is determined to be equal to or greater than a set lower limit humidity value and is determined to be equal to or less than a set upper limit humidity value, the controller is to control the first three-way valve such that the first bypass channel is open by a first opening amount that is determined so as to be proportional to the humidity value of the external air, and the controller is to control the third three-way valve such that the recirculation channel is closed.

10. The fuel cell apparatus of claim 7, wherein
when the temperature value of the external air sensed by the intake temperature sensor is determined to be equal to or greater than a target temperature value that is set based on the internal temperature value of the stack sensed by the stack temperature sensor and the humidity value of the external air sensed by the humidity sensor is determined to be greater than a set upper limit humidity value, the controller is to control the first three-way valve such that the first bypass channel is open by a set second opening amount, and the controller is to control the third three-way valve such that the recirculation channel is closed.

11. The fuel cell apparatus of claim 7, wherein
when the temperature value of the external air sensed by the intake temperature sensor is determined to be less than a target temperature value that is set based on the internal temperature value of the stack sensed by the stack temperature sensor and the humidity value of the external air sensed by the humidity sensor is determined to be less than a set lower limit humidity value, the controller is to control the first three-way valve such that the first bypass channel is closed, and the controller is to control the third three-way valve such that the recirculation channel is open by a set fourth opening amount.

12. The fuel cell apparatus of claim 7, wherein
when the temperature value of the external air sensed by the intake temperature sensor is determined to be less than a target temperature value that is set based on the internal temperature value of the stack sensed by the stack temperature sensor and the humidity value of the external air sensed by the humidity sensor is determined to be equal to or greater than a set lower limit humidity value and is determined to be equal to or less than a set upper limit humidity value, the controller is to control the first three-way valve such that the first bypass channel is open by a first opening amount that is determined so as to be proportional to the humidity value of the external air, and the controller is to control the third three-way valve such that the recirculation channel is open by a set fourth opening amount.

13. The fuel cell apparatus of claim 7, wherein
when the temperature value of the external air sensed by the intake temperature sensor is determined to be less than a target temperature value that is set based on the internal temperature value of the stack sensed by the stack temperature sensor and the humidity value of the external air sensed by the humidity sensor is determined to be greater than a set upper limit humidity value, the controller is to control the first three-way valve such that the first bypass channel is open by a set second opening amount, and the controller is to control the third three-way valve such that the recirculation channel is open by a set fourth opening amount.

14. The fuel cell apparatus of claim 3, comprising:
a first pressure gauge disposed at the second intake channel, the first pressure gauge being configured to sense a pressure of the external air to be provided to the stack; and
a second pressure gauge disposed at the exhaust channel, the second pressure gauge being configured to sense a pressure of the exhaust air from the stack, wherein
the controller is configured to control the stack air blower such that a rotational frequency of the stack air blower is increased when a difference between the pressure of the external air sensed by the first pressure gauge and the pressure of the exhaust air sensed by the second pressure gauge is determined to be less than a set differential pressure value and the controller is to control the stack air blower such that the rotational frequency of the stack air blower is decreased when the difference between the pressure of the external air sensed by the first pressure gauge and the pressure of the exhaust air sensed by the second pressure gauge is determined to be greater than the set differential pressure value.

15. The fuel cell apparatus of claim 7, comprising:
a flow meter configured to sense a flow rate of the external air from the stack air blower, wherein
the controller is configured to control the stack air blower such that a rotational frequency of the stack air blower is increased when the flow rate value sensed by the flow meter is determined to be less than a set flow rate value and such that the rotational frequency of the stack air blower is decreased when the flow rate value sensed by the flow meter is determined to be greater than the set flow rate value.

16. A fuel cell apparatus comprising:
a stack configured to perform electrochemical reaction that includes oxygen and hydrogen;
a reformer configured to provide reformed gas;
an intake channel configured to provide external air to the stack;
a humidifier configured to extract moisture contained in exhaust air from the stack and to provide the extracted moisture to the external air in the intake channel;
an exhaust channel to connect the stack to the humidifier, and configured to receive the exhaust air from the stack and to provide the exhaust air to the humidifier;
a discharge channel configured to receive the exhaust air from the humidifier;
a first bypass channel to branch from the exhaust and to join the discharge channel;
a first three-way valve disposed at a portion of the exhaust channel and to connect to the first bypass channel, and configured to adjust a degree of opening of the exhaust channel at the first three-way valve and to adjust a degree of opening of the first bypass channel;
a humidity sensor configured to sense a humidity value of the external air; and
a controller configured to control the first three-way valve such that the degree of opening of the exhaust channel and the degree of opening amount of the first bypass channel are inversely proportional to each other based on a humidity value of the external air sensed by the humidity sensor.

17. The fuel cell apparatus of claim 16, comprising:
a stack air blower to provide the external air;
an external air introduction channel configured to provide the external air to the stack air blower, wherein
the intake channel includes:
a first intake channel to connect the stack air blower to the humidifier; and
a second intake channel to connect the humidifier to the stack.

18. The fuel cell apparatus of claim 17, comprising:
a second bypass channel to branch from the first intake channel and to join the second intake channel; and
a second three-way valve disposed at a portion of the first intake channel in which the second bypass channel is branched from the first intake channel, and is configured to adjust a degree of opening of the first intake channel at the second three-way valve and to adjust a degree of opening of the second bypass channel at the second three-way valve, wherein
the humidity sensor is disposed downstream of a portion of the second intake channel in which the second bypass channel is joined to the second intake channel, and
the controller is configured to control the second three-way valve such that the degree of opening of the first intake channel and the degree of opening of the second bypass channel are inversely proportional to each other based on the humidity value of the external air sensed by the humidity sensor.

19. The fuel cell apparatus of claim 18, wherein when the humidity value of the external air sensed by the humidity sensor is determined to be less than a set lower limit humidity value, the controller is to control the first three-way valve such that the first bypass channel is closed, and is to control the second three-way valve such that the second bypass channel is closed.

20. The fuel cell apparatus of claim 17, comprising:
a recirculation channel to branch from the second intake channel and to join the external air introduction channel;
a third three-way valve disposed at a portion of the external air introduction channel in which the recirculation channel is joined to the external air introduction channel, and is configured to adjust a degree of opening of the recirculation channel at the third three-way value and to adjust a degree of opening of the external air introduction channel at the third three-way valve;
an intake temperature sensor disposed at the second intake channel, the intake temperature sensor being configured to sense a temperature value of the external air to be provided to the stack; and
a stack temperature sensor configured to sense an internal temperature value of the stack, wherein
the humidity sensor is disposed at the second intake channel, and
the controller is configured to control the third three-way valve such that the degree of opening of the recirculation channel and the degree of opening of the external air introduction channel are inversely proportional to each other based on the temperature value sensed by the intake temperature sensor and the internal temperature value sensed by the stack temperature sensor.

* * * * *